(12) United States Patent
Virolainen

(10) Patent No.: US 9,445,174 B2
(45) Date of Patent: Sep. 13, 2016

(54) AUDIO CAPTURE APPARATUS

(75) Inventor: Jussi Virolainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 14/406,483

(22) PCT Filed: Jun. 14, 2012

(86) PCT No.: PCT/IB2012/053004
§ 371 (c)(1),
(2), (4) Date: Dec. 8, 2014

(87) PCT Pub. No.: WO2013/186593
PCT Pub. Date: Dec. 19, 2013

(65) Prior Publication Data
US 2015/0208156 A1    Jul. 23, 2015

(51) Int. Cl.
| H04R 1/08 | (2006.01) |
| H04S 7/00 | (2006.01) |
| H04N 7/15 | (2006.01) |
| G10L 19/008 | (2013.01) |
| G10L 21/0216 | (2013.01) |

(52) U.S. Cl.
CPC .............. H04R 1/08 (2013.01); H04S 7/303 (2013.01); *G10L 19/008* (2013.01); *G10L 2021/02166* (2013.01); *H04N 7/15* (2013.01); *H04R 2499/10* (2013.01); *H04S 2400/15* (2013.01)

(58) Field of Classification Search
CPC .............................. H04R 1/08; H04R 2499/10
USPC ........... 381/2, 17, 92, 300, 303, 27, 58, 119; 386/239, 285; 701/211, 431; 704/500, 704/501
See application file for complete search history.

(56) References Cited

U.S. PATENT DOCUMENTS

| 5,890,125 A * | 3/1999 | Davis .................... G10L 19/008 381/1 |
| 6,016,473 A * | 1/2000 | Dolby ................... G10L 19/008 704/500 |
| 7,116,789 B2 * | 10/2006 | Layton ................... H04R 27/00 381/17 |

(Continued)

FOREIGN PATENT DOCUMENTS

| WO | 2005101905 | 10/2005 |
| WO | 2008113427 | 9/2008 |
| WO | 2011073210 | 6/2011 |

OTHER PUBLICATIONS

International Search Report and Written Opinion received for corresponding Patent Cooperation Treaty Application No. PCT/IB2012/053004, dated Jun. 13, 2013, 15 pages.

*Primary Examiner* — Gerald Gauthier
(74) *Attorney, Agent, or Firm* — Harrington & Smith

(57) ABSTRACT

An apparatus comprising: an audio signal analyser configured to analyse at least one audio signal to determine at least one audio component with an associated orientation parameter; a reference definer configured to define at least one of: a reference orientation for an apparatus; and a reference position for the apparatus; a directional determiner configured to determine a direction value based on the reference orientation/position for the apparatus and at least one of: an orientation of the apparatus; a position of the apparatus; an orientation of a further apparatus co-operating with the apparatus; and a position of the further apparatus; and a directional processor configured to process at least one associated directional parameter for the at least one audio component dependent on the direction value.

20 Claims, 9 Drawing Sheets

(56) References Cited

U.S. PATENT DOCUMENTS

| | | | |
|---|---|---|---|
| 8,160,280 B2* | 4/2012 | Strauss | H04S 7/30 381/17 |
| 8,457,328 B2* | 6/2013 | Virolainen | H04M 3/56 381/119 |
| 9,196,238 B2* | 11/2015 | Inha | H04N 5/602 |
| 9,196,257 B2* | 11/2015 | Schultz-Amling | G10L 19/173 |
| 9,246,543 B2* | 1/2016 | Zhou | H04B 3/20 |
| 2002/0150256 A1* | 10/2002 | Belrose | G11B 19/025 381/17 |
| 2008/0298597 A1* | 12/2008 | Turku | H04S 5/00 381/27 |
| 2009/0216441 A1* | 8/2009 | Bainbridge | G01C 21/20 701/431 |
| 2010/0328419 A1 | 12/2010 | Etter | |
| 2012/0046768 A1 | 2/2012 | Raoufi | |
| 2012/0076305 A1* | 3/2012 | Virolainen | H04M 3/568 381/17 |
| 2012/0121091 A1* | 5/2012 | Ojanpera | G10L 19/008 381/2 |
| 2013/0188922 A1* | 7/2013 | Furbeck | H04N 5/772 386/239 |
| 2014/0328502 A1* | 11/2014 | Virolainen | H04R 3/00 381/119 |
| 2015/0208156 A1* | 7/2015 | Virolainen | H04S 7/303 381/92 |
| 2015/0245158 A1* | 8/2015 | Vilermo | H04R 5/02 381/303 |
| 2015/0312691 A1* | 10/2015 | Virolainen | H04R 29/005 381/58 |
| 2015/0319530 A1* | 11/2015 | Virolainen | H04N 7/15 381/303 |
| 2016/0086633 A1* | 3/2016 | Virolainen | G11B 27/105 386/285 |

* cited by examiner

AUDIO CAPTURE APPARATUS

RELATED APPLICATION

This application was originally filed as PCT Application No. PCT/IB2012/053004 filed Jun. 14, 2012.

FIELD

The present application relates to apparatus for audio capture and processing of audio signals. The invention further relates to, but is not limited to, apparatus for audio capture and processing audio signals from mobile devices.

BACKGROUND

Spatial audio signals are being used in greater frequency to produce a more immersive audio experience. A stereo or multi-channel recording can be passed from the recording or capture apparatus to a listening apparatus and replayed using a suitable multi-channel output such as a pair of headphones, headset, multi-channel loudspeaker arrangement etc. Conventionally in normal headphone listening when the listener rotates their head the sound scene produced by the multi-channel audio signals rotates accordingly. In other words the sound scene rotates as the headphones are fixed to the listener's head. In virtual and augmented reality applications head tracking of the listener allows the orientation of the listener's head to be monitored relative to the environment (or the listener's body) and the orientation information used to control the stereo or multi-channel audio signals to compensate for the head rotation and so permit relatively stable environments to be perceived.

However during telepresence applications any orientation change in the recording device can produce a poor listening experience. For example head movements of a person performing recording with a headset equipped with multiple microphones cannot be easily perceived by a listener and any orientation change is perceived or experienced as a rotation of the audio scene. This rotation of the audio scene can be uncomfortable for the listener.

Similarly multi-channel or three-dimensional voice conferencing where the recording apparatus is not completely static, for example being provided by a mobile device for spatial capture, can produce a similar effect where orientation changes in the recording apparatus during the conference session can cause a rotation of the sound scene at the listening or remote end and produce a unwanted effect where the experienced participants 'change position'.

SUMMARY

Aspects of this application thus provide an audio recording or capture process whereby both recording apparatus and listening apparatus orientation can be compensated for and stabilised.

According to a first aspect there is provided an apparatus comprising at least one processor and at least one memory including computer code for one or more programs, the at least one memory and the computer code configured to with the at least one processor cause the apparatus to at least perform: analysing at least one audio signal to determine at least one audio component with an associated orientation parameter; defining at least one of: a reference orientation for the apparatus; and a reference position for the apparatus; determining a direction value based on the reference orientation/position and at least one of: an orientation of the apparatus; a position of the apparatus; an orientation of a further apparatus co-operating with the apparatus; and a position of the further apparatus; and processing at least one associated directional parameter for the at least one audio component dependent on the direction value.

The apparatus may further be caused to perform generating the at least one audio signal.

Generating the at least one audio signal may cause the apparatus to perform generating the audio signal from a microphone array and wherein determining a direction value may cause the apparatus to determine a direction value based on the reference position/orientation and at least one of: an orientation of the microphone array; a position of the microphone array.

Determining a direction value may cause the apparatus to perform determining a direction value based on at least one of: an orientation change of the apparatus with respect to the reference orientation/position; and an orientation change of the further apparatus with respect to the reference orientation/position.

Defining a reference orientation/position for the apparatus may cause the apparatus to perform: receiving a user interface input to define a reference orientation/location; determining an apparatus orientation/position; and defining the reference orientation/position as the apparatus orientation/position.

The apparatus may be further caused to perform receiving at least one of: an orientation of a further apparatus co-operating with the apparatus; and a position of the further apparatus co-operating with the apparatus.

According to a second aspect there is provided an apparatus comprising at least one processor and at least one memory including computer code for one or more programs, the at least one memory and the computer code configured to with the at least one processor cause the apparatus to at least perform: analysing at least one audio signal from a recording apparatus to determine at least one audio component with an associated orientation parameter; receiving at least one of: a reference orientation for the recording apparatus; and a reference position for the recording apparatus; receiving at least one of: an orientation of the recording apparatus; a position of the recording apparatus; an orientation of the apparatus; and a position of the apparatus; determining a direction value dependent based on the recording apparatus reference orientation/position and at least one of: an orientation of the recording apparatus; a position of the recording apparatus; an orientation of the apparatus; and a position of the apparatus; and processing at least one associated directional parameter for the at least one audio component dependent on the direction value.

Determining a direction value dependent on the recording apparatus direction value may cause the apparatus to perform determining a direction value based on at least one of: an orientation change of the recording apparatus with respect to the reference orientation for the recording apparatus; and an orientation change of the apparatus with respect to the reference orientation/position for the recording apparatus.

According to a third aspect there is provided an apparatus comprising at least one processor and at least one memory including computer code for one or more programs, the at least one memory and the computer code configured to with the at least one processor cause the apparatus to at least perform: analysing at least one audio signal from a recording apparatus to determine at least one audio component with an associated orientation parameter; receiving at least one of: a reference orientation for the recording apparatus; and a reference position for the recording apparatus; receiving at least one of: an orientation of the recording apparatus; a position of the recording apparatus; an orientation of a listening apparatus; and a position of the listening apparatus; determining a direction value, wherein the direction value is based on the reference orientation/position for the recording apparatus and at least one of: an orientation of the recording apparatus; a position of the recording apparatus; an orientation of the listening apparatus; and a position of the listening apparatus; and processing at least one associated directional parameter for the at least one audio component dependent on the direction value.

Determining a direction value may cause the apparatus to perform determining a direction value dependent on the recording apparatus direction value can cause the apparatus to perform determining a direction value based on at least one of: an orientation change of the recording apparatus with respect to the reference orientation/position for the recording apparatus; and an orientation change of the listening apparatus with respect to the reference orientation/position for the recording apparatus.

The apparatus may further be caused to perform outputting the processed audio signal to the listening apparatus.

Analysing the at least one audio signal to determine at least one audio component with an associated orientation parameter may cause the apparatus to perform: identifying at least two separate audio channels; generating at least one audio signal frame comprising a selection of audio signal samples from the at least two separate audio channels; time-to-frequency domain converting the at least one audio signal frame to generate a frequency domain representation of the at least one audio signal frame for the at least two separate audio channels; filtering the frequency domain representation into at least two sub-band frequency domain representation for the at least two separate audio channels; comparing at least two sub-band frequency domain representation for the at least two separate audio channels to determine an audio component in common; and determining an orientation parameter of the audio component relative to the apparatus.

Processing at least one associated directional parameter for the at least one audio component dependent on the direction value may cause the apparatus to perform changing at least one associated directional parameter for the at least one audio component dependent on the direction value such that the audio signal is stabilized with respect to motion of the apparatus and the reference orientation/position.

According to a fourth aspect there is provided a method comprising: analysing at least one audio signal to determine at least one audio component with an associated orientation parameter; defining at least one of: a reference orientation for an apparatus; and a reference position for the apparatus; determining a direction value based on the reference orientation/position for the apparatus and at least one of: an orientation of the apparatus; a position of the apparatus; an orientation of a further apparatus co-operating with the apparatus; and a position of the further apparatus; and processing at least one associated directional parameter for the at least one audio component dependent on the direction value.

The method may further comprise generating the at least one audio signal.

Generating the at least one audio signal may comprise generating the audio signal from a microphone array and wherein determining a direction value may comprise determining a direction value based on the reference direction and at least one of: an orientation of the microphone array; a position of the microphone array.

Determining a direction value may comprise determining a direction value based on at least one of: an orientation change of the apparatus with respect to the reference orientation/position; and an orientation change of the further apparatus with respect to the reference orientation/position.

Defining a reference orientation/position for the apparatus may comprise: receiving a user interface input to define a reference orientation/position; determining an apparatus orientation/position; and defining the reference orientation/position as the apparatus orientation/position.

The method may further comprise receiving at least one of: an orientation of a further apparatus co-operating with the apparatus; and a position of the further apparatus co-operating with the apparatus.

According to a fifth aspect there is provided a method comprising: analysing at least one audio signal from a recording apparatus to determine at least one audio component with an associated orientation parameter; receiving at least one of: a reference orientation for the recording apparatus; and a reference position for the recording apparatus; receiving at least one of: an orientation of the recording apparatus; a position of the recording apparatus; an orientation of an apparatus; and a position of the apparatus; determining a direction value dependent based on the recording apparatus reference orientation/position and at least one of: an orientation of the recording apparatus; a position of the recording apparatus; an orientation of the apparatus; and a position of the apparatus; and processing at least one associated directional parameter for the at least one audio component dependent on the direction value.

Determining a direction value dependent on the recording apparatus direction value may comprise determining a direction value based on at least one of: an orientation change of the recording apparatus with respect to the reference orientation/position for the recording apparatus; and an orientation change of the apparatus with respect to the reference orientation/position for the recording apparatus.

According to a sixth aspect there is provided a method comprising: analysing at least one audio signal from a recording apparatus to determine at least one audio component with an associated orientation parameter; receiving at least one of: a reference orientation for the recording apparatus; and a reference position for the recording apparatus; receiving at least one of: an orientation of the recording apparatus; a position of the recording apparatus; an orientation of a listening apparatus; and a position of the listening apparatus; determining a direction value, wherein the direction value is based on the reference orientation/position for the recording apparatus and at least one of: an orientation of the recording apparatus; a position of the recording apparatus; an orientation of the listening apparatus; and a position of the listening apparatus; and processing at least one associated directional parameter for the at least one audio component dependent on the direction value.

Determining a direction value may comprise determining a direction value dependent on the recording apparatus direction value may comprise determining a direction value based on at least one of: an orientation change of the recording apparatus with respect to the reference orientation/position for the recording apparatus; and an change of the listening apparatus with respect to the reference orientation/position for the recording apparatus.

The method may comprise outputting the processed audio signal to the listening apparatus.

Analysing the at least one audio signal to determine at least one audio component with an associated orientation parameter may comprise: identifying at least two separate audio channels; generating at least one audio signal frame comprising a selection of audio signal samples from the at least two separate audio channels; time-to-frequency domain converting the at least one audio signal frame to generate a frequency domain representation of the at least one audio signal frame for the at least two separate audio channels; filtering the frequency domain representation into at least two sub-band frequency domain representation for the at least two separate audio channels; comparing at least two sub-band frequency domain representation for the at least two separate audio channels to determine an audio component in common; and determining an orientation parameter of the audio component relative to the apparatus.

Processing at least one associated directional parameter for the at least one audio component dependent on the direction value may comprise changing at least one associated directional parameter for the at least one audio component dependent on the direction value such that the audio signal is stabilized with respect to motion of the apparatus and the reference orientation/position.

According to a seventh aspect there is provided an apparatus comprising: means for analysing at least one audio signal to determine at least one audio component with an associated orientation parameter; means for defining at least one of: a reference orientation for an apparatus; and a reference position for the apparatus; means for determining a direction value based on the reference orientation/position for the apparatus and at least one of: an orientation of the apparatus; a position of the apparatus; an orientation of a further apparatus co-operating with the apparatus; and a position of the further apparatus; and means for processing at least one associated directional parameter for the at least one audio component dependent on the direction value.

The apparatus may further comprise means for generating the at least one audio signal.

The means for generating the at least one audio signal may comprise means for generating the audio signal from a microphone array and wherein the means for determining a direction value may comprise means for determining a direction value based on the reference orientation/position and at least one of: an orientation of the microphone array; a position of the microphone array.

The means for determining a direction value may comprise means for determining a direction value based on at least one of: an orientation change of the apparatus with respect to the reference orientation/position; and an orientation change of the further apparatus with respect to the reference orientation/position.

The means for defining a reference orientation/position for the apparatus may comprise: means for receiving a user interface input to define a reference orientation/position; means for determining an apparatus orientation/position; and means for defining the reference orientation/position as the apparatus orientation/position.

The apparatus may further comprise means for receiving at least one of: an orientation of a further apparatus co-operating with the apparatus; and a position of the further apparatus co-operating with the apparatus.

According to an eighth aspect there is provided an apparatus comprising: means for analysing at least one audio signal from a recording apparatus to determine at least one audio component with an associated orientation parameter; means for receiving at least one of: a reference orientation for the recording apparatus; and a reference position for the recording apparatus; means for receiving at least one of: an orientation of the recording apparatus; a position of the recording apparatus; an orientation of an apparatus; and a position of the apparatus; means for determining a direction value dependent based on the recording apparatus reference orientation/position and at least one of: an orientation of the recording apparatus; a position of the recording apparatus; an orientation of the apparatus; and a position of the apparatus; and means for processing at least one associated directional parameter for the at least one audio component dependent on the direction value.

The means for determining a direction value dependent on the recording apparatus direction value may comprise means for determining a direction value based on at least one of: an orientation change of the recording apparatus with respect to the reference orientation/position for the recording apparatus; and an orientation change of the apparatus with respect to the reference orientation/position for the recording apparatus.

According to a ninth aspect there is provided an apparatus comprising: means for analysing at least one audio signal from a recording apparatus to determine at least one audio component with an associated orientation parameter; means for receiving at least one of: a reference orientation for the recording apparatus; and a reference position for the recording apparatus; means for receiving at least one of: an orientation of the recording apparatus; a position of the recording apparatus; an orientation of a listening apparatus; and a position of the listening apparatus; means for determining a direction value, wherein the direction value is based on the reference orientation/position for the recording apparatus and at least one of: an orientation of the recording apparatus; a position of the recording apparatus; an orientation of the listening apparatus; and a position of the listening apparatus; and means for processing at least one associated directional parameter for the at least one audio component dependent on the direction value.

The means for determining a direction value may comprise determining a direction value dependent on the recording apparatus direction value may comprise determining a direction value based on at least one of: an orientation change of the recording apparatus with respect to the reference orientation/position for the recording apparatus; and an orientation change of the listening apparatus with respect to the reference orientation/position for the recording apparatus.

The apparatus may comprise means for outputting the processed audio signal to the listening apparatus.

The means for analysing the at least one audio signal to determine at least one audio component with an associated orientation parameter may comprise: means for identifying at least two separate audio channels; means for generating at least one audio signal frame comprising a selection of audio signal samples from the at least two separate audio channels; means for time-to-frequency domain converting the at least one audio signal frame to generate a frequency domain representation of the at least one audio signal frame for the at least two separate audio channels; means for filtering the frequency domain representation into at least two sub-band frequency domain representation for the at least two separate audio channels; means for comparing at least two sub-band frequency domain representation for the at least two separate audio channels to determine an audio component in common; and means for determining an orientation parameter of the audio component relative to the apparatus.

The means for processing at least one associated directional parameter for the at least one audio component dependent on the direction value may comprise means for changing at least one associated directional parameter for the at least one audio component dependent on the direction value such that the audio signal is stabilized with respect to motion of the apparatus and the reference orientation/position.

According to a tenth aspect there is provided an apparatus comprising: an audio signal analyser configured to analyse at least one audio signal to determine at least one audio component with an associated orientation parameter; a reference definer configured to define at least one of: a reference orientation for an apparatus; and a reference position for the apparatus; a directional determiner configured to determine a direction value based on the reference orientation/position for the apparatus and at least one of: an orientation of the apparatus; a position of the apparatus; an orientation of a further apparatus co-operating with the apparatus; and a position of the further apparatus; and a directional processor configured to process at least one associated directional parameter for the at least one audio component dependent on the direction value.

The apparatus may further comprise at least one microphone configured to generate the at least one audio signal.

The at least one microphone may comprise a microphone array and the directional determiner may be configured to determine a direction value based on the reference orientation/position and at least one of: an orientation of the microphone array; a position of the microphone array.

The directional determiner may be configured to determine a direction value based on at least one of: an orientation change of the apparatus with respect to the reference orientation/position; and an orientation change of the further apparatus with respect to the reference orientation/position.

The reference definer may comprise: an user interface input configured to define a reference orientation/position; a sensor to determine an apparatus orientation/position; and means for defining the reference orientation/position as the apparatus orientation/position.

The apparatus may further comprise an input configured to receive at least one of: an orientation of a further apparatus co-operating with the apparatus; and a position of the further apparatus co-operating with the apparatus.

According to an eleventh aspect there is provided an apparatus comprising: an audio signal analyser configured to analyse at least one audio signal from a recording apparatus to determine at least one audio component with an associated orientation parameter; a reference input configured to receive at least one of: a reference orientation for the recording apparatus; and a reference position for the recording apparatus; an input configured to receive at least one of: an orientation of the recording apparatus; a position of the recording apparatus; an orientation of an apparatus; and a position of the apparatus; a directional determiner configured to determine a direction value dependent based on the recording apparatus reference orientation/position and at least one of: an orientation of the recording apparatus; a position of the recording apparatus; an orientation of the apparatus; and a position of the apparatus; and a directional processor configured to process at least one associated directional parameter for the at least one audio component dependent on the direction value.

The directional determiner may be configured to determine a direction value based on at least one of: an orientation change of the recording apparatus with respect to the reference orientation/position for the recording apparatus; and an orientation change of the apparatus with respect to the reference orientation/position for the recording apparatus.

According to a twelfth aspect there is provided an apparatus comprising: an audio signal analyser configured to analyse at least one audio signal from a recording apparatus to determine at least one audio component with an associated orientation parameter; a reference input configured to receive at least one of: a reference orientation for the recording apparatus; and a reference position for the recording apparatus; an input configured to receive at least one of: an orientation of the recording apparatus; a position of the recording apparatus; an orientation of a listening apparatus; and a position of the listening apparatus; a directional determiner configured to determine a direction value, wherein the direction value is based on the reference orientation/position for the recording apparatus and at least one of: an orientation of the recording apparatus; a position of the recording apparatus; an orientation of the listening apparatus; and a position of the listening apparatus; and a directional processor configured to process at least one associated directional parameter for the at least one audio component dependent on the direction value.

The directional processor may be configured to determine a direction value dependent on the recording apparatus direction value may comprise determining a direction value based on at least one of: an orientation change of the recording apparatus with respect to the reference orientation for the recording apparatus; and an orientation change of the listening apparatus with respect to the reference orientation/position for the recording apparatus.

The apparatus may comprise an output configured to output the processed audio signal to the listening apparatus.

The audio analyser may comprise: a channel identifier configured to identify at least two separate audio channels; a framer configured to generate at least one audio signal frame comprising a selection of audio signal samples from the at least two separate audio channels; a time-to-frequency domain converter configured to time-to-frequency domain convert the at least one audio signal frame to generate a frequency domain representation of the at least one audio signal frame for the at least two separate audio channels; a filter configured to filter the frequency domain representation into at least two sub-band frequency domain representation for the at least two separate audio channels; a correlator configured to compare at least two sub-band frequency domain representation for the at least two separate audio channels to determine an audio component in common; and orientation determiner configured to determining an orientation parameter of the audio component relative to the apparatus.

The directional processor may comprise an orientation modifier configured to change at least one associated directional parameter for the at least one audio component dependent on the direction value such that the audio signal is stabilized with respect to motion of the apparatus and the reference orientation/position.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS

The following describes in further detail suitable apparatus and possible mechanisms for the provision of effective orientation or direction compensation for audio capture and audio listening apparatus. In the following examples audio signals and processing is described. However it would be appreciated that in some embodiments the audio signal/audio capture and processing is a part of an audio video system.

The concept of this application is related to assisting in the production of immersive person to person communication and can include video (and in some embodiments synthetic or computer generated content).

Figure 1:
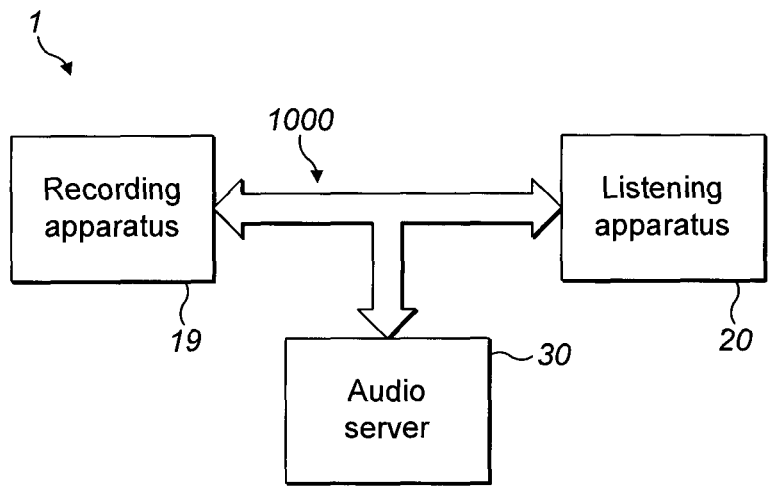
FIG. 1 shows schematically an audio capture and listening system which may encompass embodiments of the application.

With respect to FIG. 1 an overview of a suitable system within which embodiments of the application can be located is shown.

The audio space 1 can have located within it at least one recording or capturing device or apparatus 19 positioned within the audio space to record suitable audio scenes. The recording apparatus 19 can be capable of attempting to capture the audio scene or activity within the audio space. The activity can be any event the user of the recording apparatus wishes to capture. For example the event can be a music event or an audio part of a news worthy event. The recording apparatus 19 can in some embodiments transmit or alternatively store for later consumption the captured audio signals. The recording apparatus can transmit over a transmission channel 1000 to a listening apparatus 20 or in some embodiments to an audio server 30. The recording apparatus 19 in some embodiments can encode the audio signal to compress the audio signal in a known way in order to reduce the bandwidth required in "uploading" the audio signal to the audio server 30 or listening apparatus 20.

The recording apparatus 19 in some embodiments can be configured to upload or transmit via the transmission channel 1000 to the audio server 30 or listening apparatus 20 an estimation of the location and/or the orientation (or direction) of the apparatus. The positional information can be obtained, for example, using GPS coordinates, cell-id or assisted GPS or only other suitable location estimation methods and the orientation//direction can be obtained, for example using a digital compass, accelerometer, or GPS information.

In some embodiments the recording apparatus 19 can be configured to capture or record one or more audio signals. For example the apparatus in some embodiments can comprise multiple sets of microphones, each microphone set configured to capture the audio signal from a different direction. In such embodiments the recording apparatus 19 can record and provide more than one signal from the different direction/orientations and further supply position/orientation information for each signal.

In some embodiments the system comprises a listening apparatus 20. The listening apparatus 20 can be coupled directly to the recording apparatus 19 via the transmission channel 1000. In some embodiments the audio signal and other information can be received from the recording apparatus 19 via the audio server 30. In some embodiments the listening apparatus 20 can prior to or during downloading an audio signal select a specific recording apparatus or a defined listening point which is associated with a recording apparatus or group of recording apparatus. In other words in some embodiments the listening apparatus 20 can be configured to select a position from which to 'listen' to the recorded or captured audio scene. In such embodiments the listening apparatus 20 can select a recording apparatus 19 or enquire from the audio server 30 the suitable recording apparatus audio stream associated with the selected listening point.

The listening apparatus 20 is configured to receive a suitably encoded audio signal, decode the audio signal and present the audio signal to the user operating the listening apparatus 20.

In some embodiments the system comprises an audio server 30. The audio server in some embodiments can be configured to receive audio signals from the recording apparatus 19 and store the audio signals for later recall by the listening apparatus 20. The audio server 30 can be configured in some embodiments to store multiple recording apparatus audio signals. In such embodiments the audio server 30 can be configured to receive an indication from a listening apparatus 20 indicating one of the audio signals or in some embodiments a mix of at least two audio signals from different recording apparatus.

Figure 2:
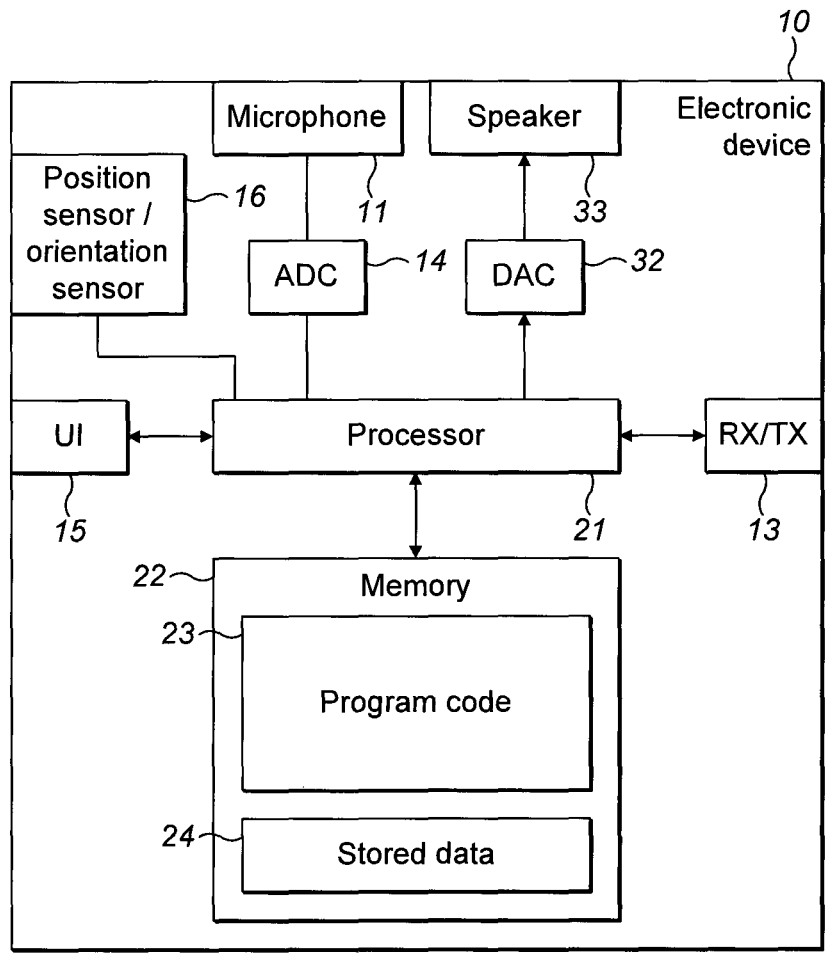
FIG. 2 shows schematically an apparatus suitable for being employed in some embodiments.

In this regard reference is first made to FIG. 2 which shows a schematic block diagram of an exemplary apparatus or electronic device 10, which may be used to record (or operate as a recording apparatus 19) or listen (or operate as a listening apparatus 20) to the audio signals (and similarly to record or view the audio-visual images and data). Furthermore in some embodiments the apparatus or electronic device can function as the audio server 30. It would be understood that in some embodiments the same apparatus can be configured or re-configured to operate as all of the recording apparatus 19, listening apparatus 20 and audio server 30.

The electronic device 10 may for example be a mobile terminal or user equipment of a wireless communication system when functioning as the recording apparatus or listening apparatus. In some embodiments the apparatus can be an audio player or audio recorder, such as an MP3 player, a media recorder/player (also known as an MP4 player), or any suitable portable apparatus suitable for recording audio or audio/video camcorder/memory audio or video recorder.

The apparatus 10 can in some embodiments comprise an audio subsystem. The audio subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 11 is a digital microphone array, in other words configured to generate a digital signal output (and thus not requiring an analogue-to-digital converter). The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'integrated' microphones containing both audio signal generating and analogue-to-digital conversion capability.

In some embodiments the apparatus 10 audio subsystems further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can comprise in some embodiments a speaker 33. The speaker 33 can in some embodiments receive the output from the digital-to-analogue converter 32 and present the analogue audio signal to the user. In some embodiments the speaker 33 can be representative of multi-speaker arrangement, a headset, for example a set of headphones, or cordless headphones.

Although the apparatus 10 is shown having both audio capture and audio presentation components, it would be understood that in some embodiments the apparatus 10 can comprise one or the other of the audio capture and audio presentation parts of the audio subsystem such that in some embodiments of the apparatus the microphone (for audio capture) or the speaker (for audio presentation) are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals. The processor 21 can be configured to execute various program codes. The implemented program codes can comprise for example audio recording and audio listening routines. In some embodiments the program codes can be configured to perform audio scene stabilisation.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The coupling can, as shown in FIG. 1, be the transmission channel 1000. The transceiver 13 can communicate with further apparatus by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, and a gyroscope or be determined by the motion of the apparatus using the positioning estimate.

It is to be understood again that the structure of the electronic device 10 could be supplemented and varied in many ways.

Furthermore it could be understood that the above apparatus 10 in some embodiments can be operated as an audio server 30. In some further embodiments the audio scene server 30 can comprise a processor, memory and transceiver combination.

The concept of the embodiments described herein is the ability to monitor the orientation of the recording apparatus and/or listening apparatus and the controlling of spatial audio presentation and sound scene orientation using this orientation information. Thus in some embodiments the orientation of the recording apparatus can be monitored according to the sensors as described herein (or by using any suitable head tracker or other information) and the orientation information used to control at least one of spatial capturing, post processing or audio rendering of the audio signal. The recording apparatus orientation and reference direction can, as described herein, be included with the audio signal as metadata. The use of the orientation information can thus be used to compensate for orientation changes in the recording apparatus to stabilise the recorded sound scene or in other words to produce an audio "steady cam" effect or technique for audio recording or capture.

Figure 3:
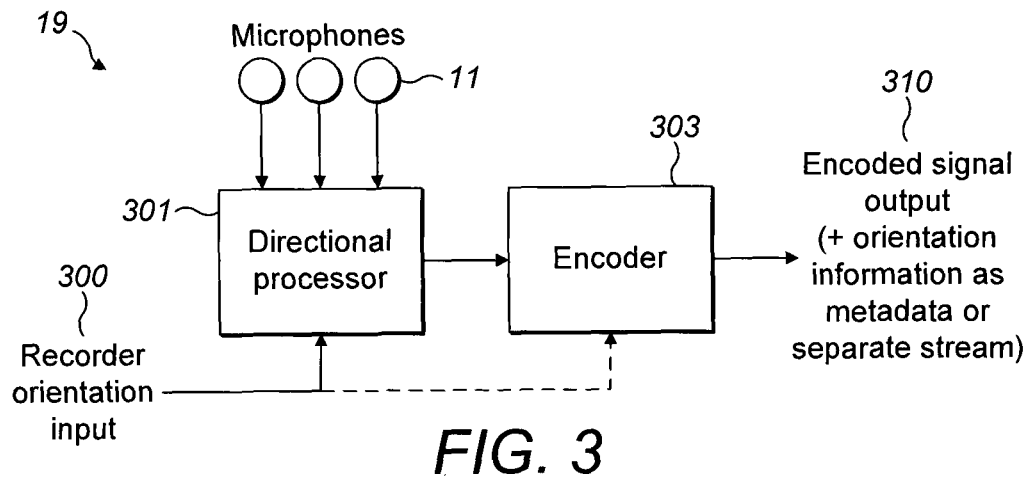
FIG. 3 shows schematically an example recording apparatus according to some embodiments.

With respect to FIG. 3 an example recording apparatus 19 is shown according to some embodiments. The operation of recording apparatus 19 shown in FIG. 3 is furthermore described with respect to the flow diagrams shown in FIGS. 4 and 5.

In some embodiments the recording apparatus 19 comprises a microphone array 11, such as described herein with respect to FIG. 2, configured to generate audio signals from the acoustic waves in the neighbourhood of the apparatus. It would be understood that in some embodiments the microphone array 11 is not physically coupled or attached to the recording apparatus (for example the microphones can be attached to a headband or headset worn by the user of the recording apparatus) and can transmit the audio signals to the recording apparatus. For example the microphones mounted on a headset or similar apparatus are coupled by a wired or wireless coupling to the recording apparatus.

The microphones 11 can be configured to output the audio signal to a directional processor 301.

Figure 4:
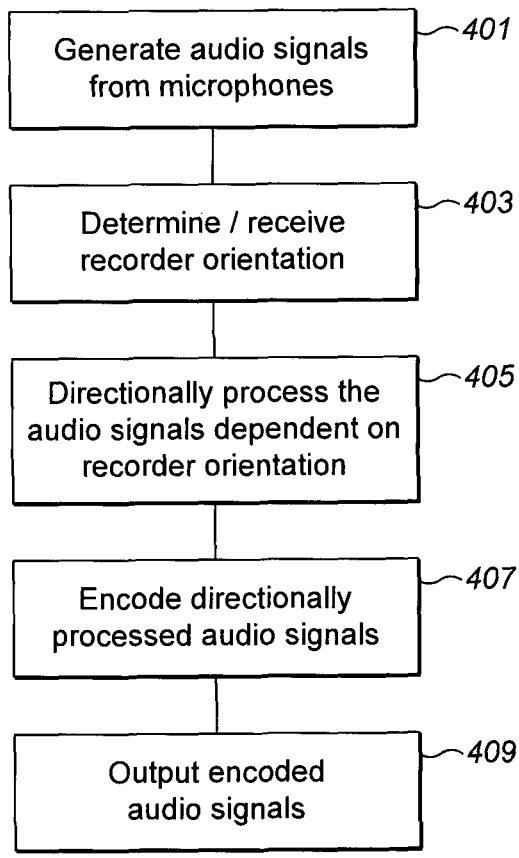
FIG. 4 shows schematically a flow diagram of the operation of the recording apparatus according to some embodiments.

The operation of generating audio signals from the microphones is shown in FIG. 4 by step 401.

In some embodiments the recording apparatus can be configured to receive or determine the recorder apparatus (and in particular the microphone) orientation. This is shown in FIG. 3 by the recorder orientation input 300 coupled to the directional processor 301. It would be understood that in some embodiments, for example where the microphones are not physically coupled to the recording apparatus (for example mounted on a head set separate from the recording apparatus) that the orientation sensor or determination can be located on the microphones, for example with a sensor in the headset and this information is transmitted or passed to the directional processor 301.

The recording apparatus orientation information can in some embodiments be sampled or provided at a lower frequency rate than the audio signals are sampled. For example in some embodiments an orientation sampling frequency of 100 Hz provides acceptable compensation processing results. The orientation information can be generated according to any suitable format. For example in some embodiments the orientation information can be in the form of an orientation parameter. The orientation parameter can be represented in some embodiments by a floating point number or fixed point (or integer) value. Furthermore in some embodiments the resolution of the orientation information can be any suitable resolution. For example, as it is known that the resolution of human auditory system in its best region (in front of the listener) is about ~1 degree the orientation information (azimuth) value can be an integer value from 0 to 360 with a resolution of 1 degree. However it would be understood that in some embodiments a resolution of greater than or less than 1 degree can be implemented especially where signalling efficiency or bandwidth is limited.

The operation of determining or receiving the recorder orientation is shown in FIG. 4 by step 403.

It would be understood that in some embodiments the recorder orientation determination or information is provided at the same time or in parallel with the audio signal presentation to the directional processor.

In some embodiments the recording apparatus comprises a directional processor 301. The directional processor 301 can be configured to receive the audio signals generated by the microphone array 11 and further to receive the recorder orientation input 300 comprising the recorder orientation information.

The directional processor 301 can be configured in some embodiments to perform audio signal processing on the received audio signals to compensate for orientation changes in the recording device.

The directional processor 301 can perform any suitable spatial audio processing compensation depending on the audio signal format provided.

For example in some embodiments the directional processor 301 can be configured to process the audio signals generated from the microphones to determine spatial information from the audio signal. For example in some embodiments the directional processor 301 can be configured to determine from the audio signal a number of audio sources from which the significant portion of the audio signal energy is generated and determine the source directions.

An example directional processing of the audio signal is described as follows. However it would be understood that any suitable audio signal directional processing in either the time or other representational domain (frequency domain etc) can be used.

In some embodiments the directional processor 301 comprises a framer. The framer or suitable framer means can be configured to receive the audio signals from the microphones and divide the digital format signals into frames or groups of audio sample data. In some embodiments the framer can furthermore be configured to window the data using any suitable windowing function. The framer can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer can be configured to output the frame audio data to a Time-to-Frequency Domain Transformer.

In some embodiments the directional processor comprises a Time-to-Frequency Domain Transformer. The Time-to-Frequency Domain Transformer or suitable transformer means can be configured to perform any suitable time-to-frequency domain transformation on the frame audio data. In some embodiments the Time-to-Frequency Domain Transformer can be a Discrete Fourier Transformer (DFT). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer can be configured to output a frequency domain signal for each microphone input to a sub-band filter.

In some embodiments the directional processor 301 comprises a sub-band filter. The sub-band filter or suitable means can be configured to receive the frequency domain signals from the Time-to-Frequency Domain Transformer for each microphone and divide each microphone audio signal frequency domain signal into a number of sub-bands.

The sub-band division can be any suitable sub-band division. For example in some embodiments the sub-band filter can be configured to operate using psychoacoustic filtering bands. The sub-band filter can then be configured to output each domain range sub-band to a direction analyser.

In some embodiments the directional processor 301 can comprise a direction analyser. The direction analyser or suitable means can in some embodiments be configured to select a sub-band and the associated frequency domain signals for each microphone of the sub-band.

The direction analyser can then be configured to perform directional analysis on the signals in the sub-band. The directional analyser can be configured in some embodiments to perform a cross correlation between the microphone/decoder sub-band frequency domain signals within a suitable processing means.

In the direction analyser the delay value of the cross correlation is found which maximises the cross correlation of the frequency domain sub-band signals. This delay can in some embodiments be used to estimate the angle or represent the angle from the dominant audio signal source for the sub-band. This angle can be defined as α. It would be understood that whilst a pair or two microphones can provide a first angle, an improved directional estimate can be produced by using more than two microphones and preferably in some embodiments more than two microphones on two or more axes.

The directional analyser can then be configured to determine whether or not all of the sub-bands have been selected. Where all of the sub-bands have been selected in some embodiments then the direction analyser can be configured to output the directional analysis results. Where not all of the sub-bands have been selected then the operation can be passed back to selecting a further sub-band processing step.

The above describes a direction analyser performing an analysis using frequency domain correlation values. However it would be understood that the object detector and separator can perform directional analysis using any suitable method. For example in some embodiments the object detector and separator can be configured to output specific azimuth-elevation values rather than maximum correlation delay values. Furthermore in some embodiments the spatial analysis can be performed in the time domain.

In some embodiments this direction analysis can therefore be defined as receiving the audio sub-band data;

$$X_k^b(n) = X_k(n_b+n), n=0, \ldots, n_{b+1}-1, b=0, \ldots, B-1$$

where $n_b$ is the first index of bth subband. In some embodiments for every subband the directional analysis as described herein as follows. First the direction is estimated with two channels. The direction analyser finds delay $\tau_b$ that maximizes the correlation between the two channels for subband b. DFT domain representation of e.g. $X_k^b(n)$ can be shifted $\tau_b$ time domain samples using $$X_{k,\tau_B}^b(n) = X_k^b(n)e^{-j\frac{2\pi n \tau_b}{N}}.$$

The optimal delay in some embodiments can be obtained from $$\max_{\tau_b} \text{Re}\left( \sum_{n=0}^{n_{b+1}-n_b-1} (X_{2,\tau_b}^b(n)^+ X_B^b(n)) \right), \tau_b \in [-D_{tot}, D_{tot}]$$

where Re indicates the real part of the result and * denotes complex conjugate. $X_{2,\tau_b}^b$ and $X_3^b$ are considered vectors with length of $n_{b+1}-n_b$ samples. The direction analyser can in some embodiments implement a resolution of one time domain sample for the search of the delay.

In some embodiments the object detector and separator can be configured to generate a sum signal. The sum signal can be mathematically defined as.

$$X_{sum}^b = \begin{cases} (X_{2,\tau_b}^b + X_B^b)/2 & \tau_b \leq 0 \\ (X_2^b + X_{B,-\tau_b}^b)/2 & \tau_b > 0 \end{cases}$$

In other words the object detector and separator is configured to generate a sum signal where the content of the channel in which an event occurs first is added with no modification, whereas the channel in which the event occurs later is shifted to obtain best match to the first channel.

It would be understood that the delay or shift $\tau_b$ indicates how much closer the sound source is to one microphone (or channel) than another microphone (or channel). The direction analyser can be configured to determine actual difference in distance as $$\Delta_{2B} = \frac{v\tau_b}{F_s}$$

where Fs is the sampling rate of the signal and v is the speed of the signal in air (or in water if we are making underwater recordings).

The angle of the arriving sound is determined by the direction analyser as, $$d_b = \pm \cos^{-1}\left( \frac{\Delta_{2B}^2 + 2B\Delta_{2B} - d^2}{2 \, db} \right)$$

where d is the distance between the pair of microphones/channel separation and b is the estimated distance between sound sources and nearest microphone. In some embodiments the direction analyser can be configured to set the value of b to a fixed value. For example b=2 meters has been found to provide stable results.

It would be understood that the determination described herein provides two alternatives for the direction of the arriving sound as the exact direction cannot be determined with only two microphones/channels.

In some embodiments the object detector and separator can be configured to use audio signals from a third channel or the third microphone to define which of the signs in the determination is correct. The distances between the third channel or microphone and the two estimated sound sources are:

$$\delta_b^+ = \sqrt{(h + b\sin(d_b))^2 + (d/2 + b\cos(d_b))^2}$$
$$\delta_b^- = \sqrt{(h - b\sin(d_b))^2 + (d/2 + b\cos(d_b))^2}$$

where h is the height of an equilateral triangle (where the channels or microphones determine a triangle), i.e.

$$h = \frac{\sqrt{B}}{2}\dot{a}.$$

The distances in the above determination can be considered to be equal to delays (in samples) of;

$$\tau_b^+ = \frac{\delta^+ - b}{v}F_s$$
$$\tau_b^- = \frac{\delta^- - b}{v}F_s$$

Out of these two delays the object detector and separator in some embodiments is configured to select the one which provides better correlation with the sum signal. The correlations can for example be represented as $$c_b^+ = \text{Re}\left(\sum_{n=0}^{n_{b+1}-n_b-1} \left(X_{sum,\tau_b^-}^b(n)\right)^+ X_1^b(n)\right)$$

$$c_b^- = \text{Re}\left(\sum_{n=0}^{n_{b+1}-n_b-1} \left(X_{sum,\tau_b^-}^b(n)\right)^+ X_1^b(n)\right)$$

The object detector and separator can then in some embodiments then determine the direction of the dominant sound source for subband b as:

$$a_b = \begin{cases} \dot{a}_b & c_b^+ \geq c_b^- \\ -a_b & c_b^+ < c_b^- \end{cases}.$$

In some embodiments the object detector and separator further comprises a mid/side signal generator. The main content in the mid signal is the dominant sound source found from the directional analysis. Similarly the side signal contains the other parts or ambient audio from the generated audio signals. In some embodiments the mid/side signal generator can determine the mid M and side S signals for the sub-band according to the following equations:

$$M^b = \begin{cases} (X_{2,\tau_b}^b + X_B^b)/2 & \tau_b \leq 0 \\ (X_2^b + X_{B,-\tau_b}^b)/2 & \tau_b > 0 \end{cases}$$

$$S^b = \begin{cases} (X_{2,\tau_b}^b - X_B^b)/2 & \tau_b \leq 0 \\ (X_2^b - X_{B,-\tau_b}^b)/2 & \tau_b > 0 \end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. The mid and side signals can be determined in such a manner in some embodiments is suitable where the microphones are relatively close to each other. Where the distance between the microphones is significant in relation to the distance to the sound source then the mid/side signal generator can be configured to perform a modified mid and side signal determination where the channel is always modified to provide a best match with the main channel.

The directional processor 301 can then, having determined spatial parameters from the recorded audio signals, be configured to compensate for the recorder orientation changes by modifying the direction of the sources. For example the directional processor 301 can be configured to process or modify the direction of the dominant sound source for at least one of the subbands.

Thus for example where the recorder orientation input comprises a signal θ(t) the directional processor can be configured to compensate for any difference in the recorder orientation input since a defined time instant $t_0$. This can for example be mathematically be indicated as $$\alpha'_b(t) = \alpha_b(t) - [\theta(t_0) - \theta(t)],$$

where $\alpha'_b(t)$ is the modified direction of the dominant sound source for subband b at time t, $\alpha_b(t)$ is the direction of the dominant sound source for subband b at time t, $\theta(t_0)$ the recorder apparatus orientation at a defined time instant and θ(t) the recorder apparatus orientation at time t.

The operation of directionally processing the audio signals dependent on the recorder orientation is shown in FIG. 4 by step 405.

The directionally processed audio signals are then passed to an encoder 303.

In some embodiments the recording apparatus 19 comprises an encoder 303 configured to encode the directionally processed audio signals according to any suitable encoding format.

In some embodiments where the encoder is configured to generate both audio signals and spatial parameters then the encoder can be configured to perform spatial audio encoding. Examples of spatial audio encoding include SAOC (spatial audio object coding) or BCC (Binaural Cue Coding). Typically in such embodiments a mono downmix is created from the input audio signals and the mono downmix channel encoded and output or transmitted with the spatial parameters.

The operation of encoding the directionally processed audio signals is shown in FIG. 4 by step 407.

The encoder can then pass the encoded audio signals to be output on the encoded signal output 310. It would be understood that in some embodiments the encoder 303 is coupled to a transceiver for transmitting the encoded audio signals on the transmission channel 1000 to either the listening apparatus or audio server. In some other embodiments the encoder 303 can be configured to pass the encoded audio signals to a memory or storage apparatus within the recording apparatus 19 so that the encoded audio signals can be transmitted or recalled at a later time.

The operation of outputting the encoded directionally processed audio signals is shown in FIG. 4 by step 409.

Figure 5:
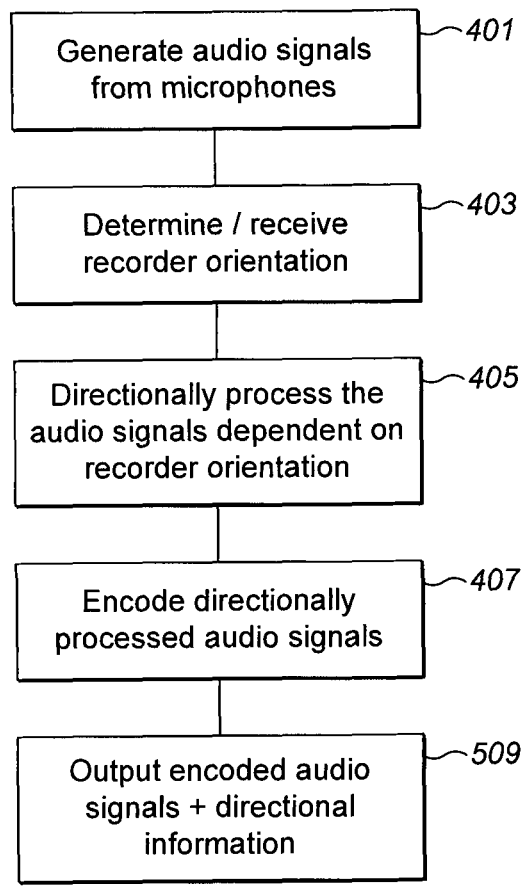
FIG. 5 shows a further flow diagram of the operation of the recording apparatus according to some embodiments.

With respect to FIG. 5 a further flow diagram shows a further operation of the recording apparatus shown in FIG.

3 with respect to the dashed line coupling the recorder orientation input 300 to the encoder 303. The operation of the recording apparatus 19 with respect to these embodiments is similar to the operation shown in FIG. 4.

Therefore the operation of generating audio signals from the microphones is shown in FIG. 5 by step 401.

The operation of determining or receiving the recorder orientation is shown in FIG. 5 by step 403.

The operation of directionally processing the audio signals dependent on the recorder orientation is shown in FIG. 5 by step 405.

Furthermore the operation of encoding the directionally processed audio signals is shown in FIG. 4 by step 407.

However following the encoding of the directionally processed audio signals the encoder 303 can be configured to further receive the directional or orientation information from the recorder apparatus orientation input 300. The encoder can then in some embodiments output with the encoded audio signal the orientation or directional information. In some embodiments the encoder 303 can be configured to output the orientation directional information as metadata. In some embodiments the orientation information is output as a separate stream or channel.

The operation of outputting the encoded audio signals and the (orientation) directional information is shown in FIG. 5 by step 509.

Figure 6:
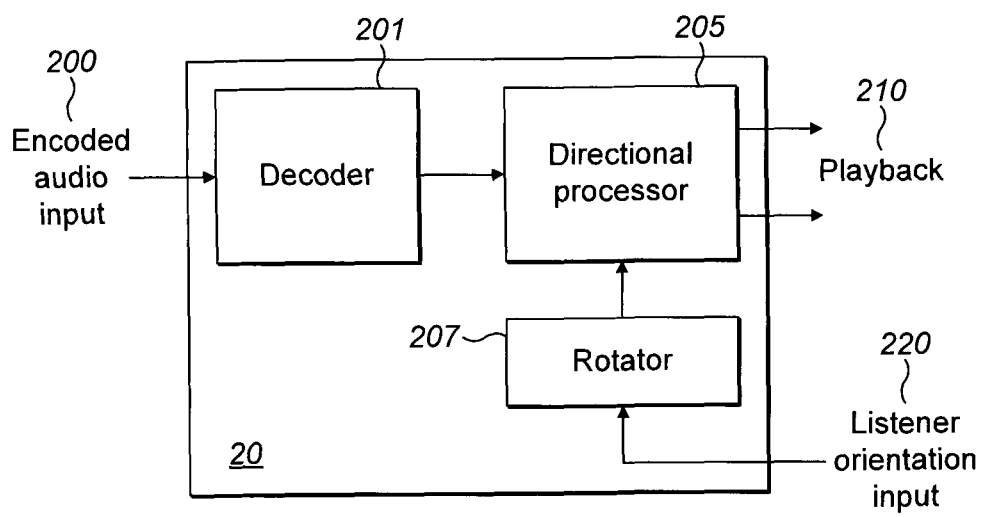
FIG. 6 shows schematically the listening apparatus suitable for receiving audio signals from the recording apparatus shown in FIG. 3 according to some embodiments.

With respect to FIG. 6 an example listening apparatus suitable for receiving the encoded audio signal from the recording apparatus as shown in FIG. 3 is shown. Furthermore with respect to FIG. 7 the flow diagram showing the operation of the listening apparatus shown in FIG. 6 is shown in further detail.

In some embodiments the listening apparatus 20 comprises an encoded audio input 200 configured to receive the encoded audio signal. The encoded audio input 200 can in some embodiments be configured to output the encoded audio signal to a decoder 201

Figure 7:
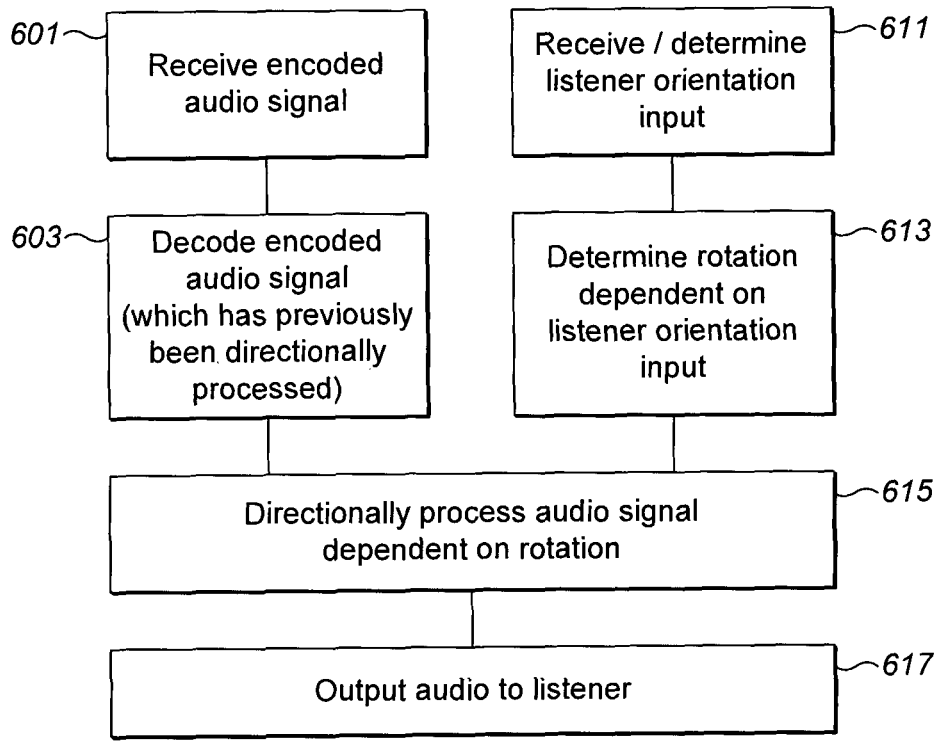
FIG. 7 shows a flow diagram of the operation of the listening apparatus shown in FIG. 6 according to some embodiments.

The operation of receiving the encoded audio signal is shown in FIG. 7 by step 601.

In some embodiments the listening apparatus 20 comprises a decoder 201. The decoder can be configured to receive via an encoded audio input 200 the encoded audio signal.

In some embodiments where multichannel audio signals are received these signals can be decoded and directional processing is applied to these audio signals. In some embodiments any directional processing applied to the received or retrieved audio signals can include similar analysis and processing which occurs within the encoder in the recording device as described herein. Thus, for example multichannel audio signals can be converted first to a representation that enables audio scene rotation operations to be performed on them.

In some embodiments where the encoder has performed encoding specifically for a multichannel reproduction system (for example a 5.1 channel target reproduction system), the operations or performing directional analysis can be optional and rotation operations applied by modifying the virtualized loudspeaker positions when signals are reproduced over headphones for the listener. This audio reproduction using headphones for the listener can for example be a virtual surround sound audio signal reproduction.

In some embodiments where the encoded audio signal is a downmixed audio signal received with spatial side information, the directional processing can be performed before decoding the signals for reproduction. In such embodiments a rotation operation can be performed by modifying the direction vectors of the subbands and decoding the output signals after this operation. In such embodiments separate directional analysis stages are not needed. The direction vectors are for example dominant sound source directions.

In some embodiments the encoded audio signal is a B-format signal (generated in the directional processor in the recording device or recorded using a sound-field microphone). In such embodiments any rotation operation on B-format signals can be performed by a simple and efficient matrix multiplication operation.

The decoder 201 can be configured to perform the inverse operation to the encoder 303 shown in FIG. 3. Thus for example in some embodiments the decoder 201 is configured to output the sub-band dominant signal angle and a mid and side signal format signal.

The operation of decoding the encoded audio signal (which has previously been directionally processed in the recording device) is shown in FIG. 7 by step 603.

In some embodiments the listening apparatus 20 is configured to receive a listener orientation input 220. The listener orientation input 220 can for example by provided by any suitable orientation or location sensor as described herein. The listener orientation input 220 can be passed to a rotator 207. In some embodiments the listener orientation input 220 can be generated or determined by monitoring the audio environment of the listening apparatus 20. In such embodiments by applying similar directional analysis to that described herein with respect to the recording apparatus 19 the listening apparatus 20 audio environment sources and their orientations determined and when the source orientations move then the listener orientation is determined to have moved in the opposite direction by that amount. In some arrangements listener head orientation is monitored using headtracker.

The operation of receiving or determining the listener orientation input is shown in FIG. 7 by step 611.

In some embodiments the listening apparatus 20 comprises a rotator 207. The rotator 207 is configured to receive the listener orientation input 220 (in other words the listener apparatus orientation information). Furthermore the rotator is configured to generate a rotational value compensating for the rotation of the listening apparatus 20. In some embodiments this can, for example, be an angle relative to a defined orientation. The defined orientation can in some embodiments be defined within the listening apparatus, be implicitly defined by the recording apparatus (or audio server), or in some embodiments be explicitly indicated by the recording apparatus (or audio server).

Thus for example where the listener orientation input comprises a signal $\lambda(t)$ the directional processor can be configured to compensate for any difference in the listener orientation input since a defined time instant $t_0$. This can mathematically be for example a simple rotational difference as shown by $$\rho(t)=[\lambda(t_0)-\lambda(t)],$$

where $\rho(t)$ is the rotator output at time t defined by the orientation difference between $\lambda(t_0)$ the listener apparatus orientation at a defined time instant and $\lambda(t)$ the listener apparatus orientation at time t.

The operation of determining the rotation dependent on the listener orientation input is shown in FIG. 7 by step 613.

In some embodiments the rotator can be configured to receive at least one user input. The user input can in some embodiments be generated by the user interface. The user input can thus permit the listener (or where the user input is received from the recorder apparatus the user of the recorder) to rotate the audio scene manually. For example in some embodiments the rotational difference operation shown herein can be represented as:

$$\rho(t)=[\lambda(t_0)-\lambda(t)+\rho_0],$$

where the term $\rho_0$ represents the user interface input or user input rotation. It would be understood that in some embodiments where both a recorder apparatus user input and listener apparatus user input is received then the $\rho_0$ term is a combination of both the recorder apparatus and listener apparatus user inputs.

The output of the rotator 207 can, in some embodiments, be passed to the directional processor 205.

In some embodiments the listening apparatus 20 comprises a directional processor 205 configured to receive the output of the decoder 201 and further the output of the rotator 207. The directional processor 205 can be configured to directionally process the audio signals from the decoder according to the orientation value from the rotator 207.

Thus in some embodiments the decoder output can have the sub-band dominant signal angle modified by the rotator angle value $\rho(t)$.

This can for example be mathematically be indicated as $$\alpha''_b(t)=\alpha'_b(t)+\rho(t),$$

where $\alpha''_b(t)$ is the modified at the listener apparatus direction of the dominant sound source for subband b at time t, and $\alpha'_b(t)$ is the recorder apparatus modified direction of the dominant sound source for subband b at time t (the decoded audio signal).

The operation of directionally processing the audio signal dependent on the rotation angle value is shown in FIG. 7 by step 615.

In some embodiments the directional processor 205 is configured to apply the Rotator 207 derived rotation value to the whole sound scene (in other words the same rotation is applied to all sub-bands). However in some embodiments the directional processor 205 can be configured to apply the rotation value to certain sound sources (in other words the rotation is applied to specific or determined sub-bands, where the sub-band represents a sound source). In some embodiments the directional processor 205 can be configured to apply the rotation value to determined sources dependent on the source orientation or direction. For example the direction processor 205 can in some embodiments be configure to rotate the source which are within a specific orientation arc—such as the sources within −45 to +45 degrees of the listener apparatus 'forward' orientation. In such embodiments the directional processor 205 can be configured to search the sub-bands to determine which sub-bands have sources with suitable orientation values and rotate only these sub-bands (sources).

Furthermore in some embodiments the directional processor 205 can be configured to render the directionally processed audio signals and output the rendered signals to a playback output 210. The playback output can for example be coupled to a multi-speaker output or suitable headphones or headset.

Furthermore the outputting the audio to the listener is shown in FIG. 7 by step 617.

Figure 8:
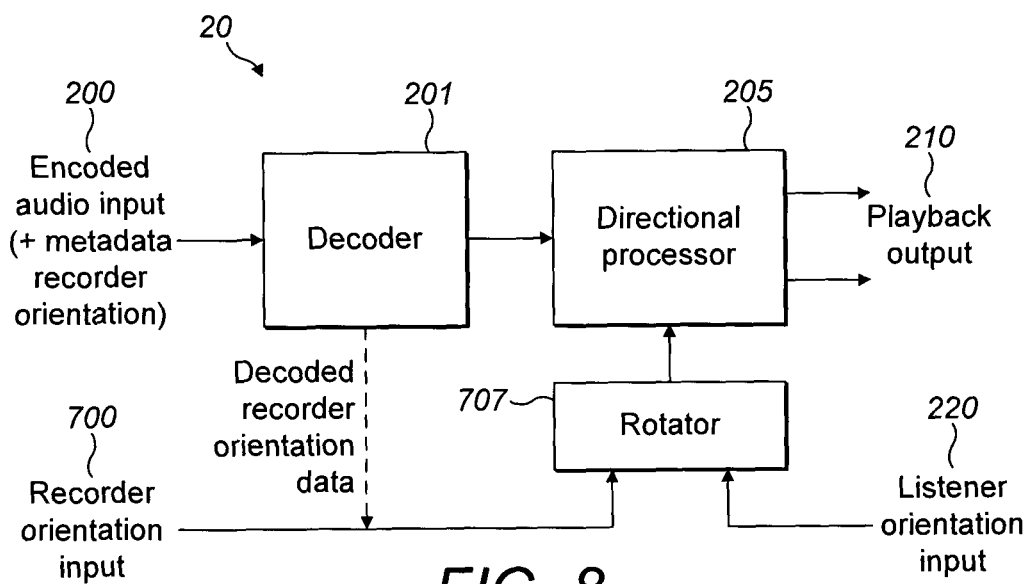
FIG. 8 shows schematically a further example of listening apparatus according to some embodiments.

With respect to FIG. 8 a further listening apparatus is shown according to some embodiments. With respect to FIG. 9 a flow diagram showing the operation of the listening apparatus shown in FIG. 8 according to some embodiments is further described. In some embodiments the listening apparatus 20 can be configured to receive an encoded audio input 200 comprising an encoded audio signal which may or may not have been directionally processed.

Figure 9:
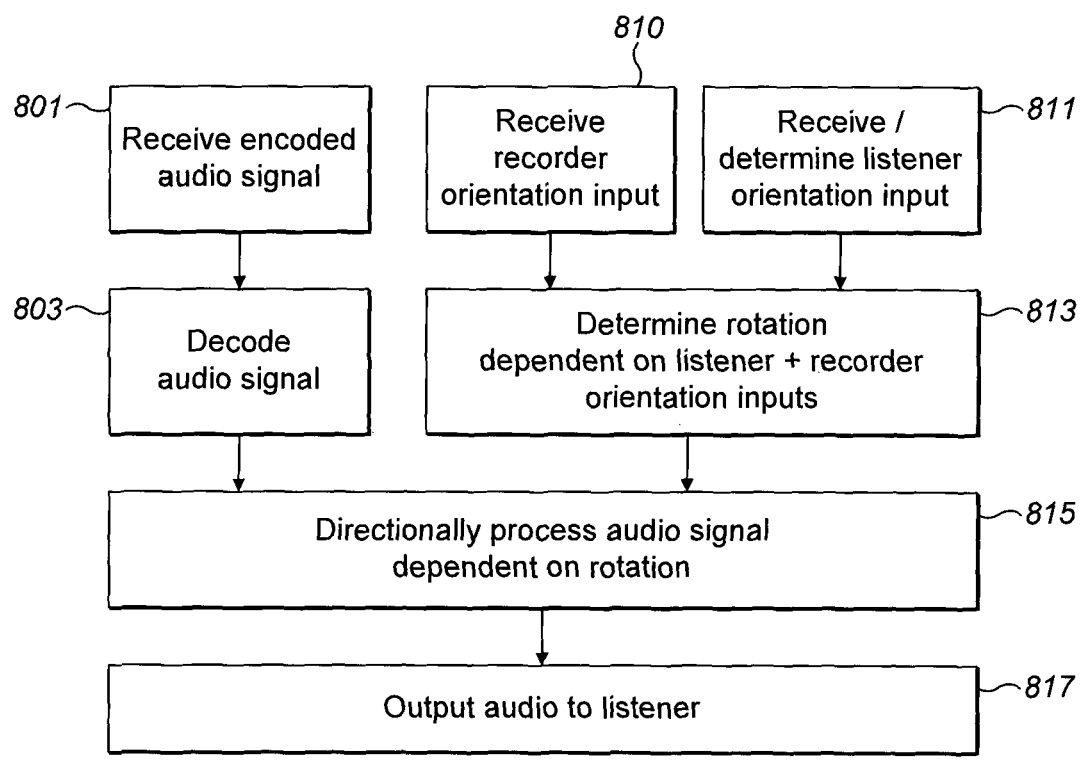
FIG. 9 shows a flow diagram of the operation of the listening apparatus shown in FIG. 8 according to some embodiments.

The operation of receiving the encoded audio signal is shown in FIG. 9 by step 801.

In some embodiments the listening apparatus 20 comprises a decoder 201 similar to the decoder shown with respect to the listening apparatus shown in FIG. 6.

The decoder 201 can be configured to receive the encoded audio signal and to decode the audio signal according to the suitable audio decoding mechanism. The decoder 201 can be configured to output a suitable decoded format audio signal. For example, in some embodiments, the suitable decoded format audio signal is that of the sub-band dominant angle, mid signal and side signal. The decoder 201 can thus perform the inverse operation to the encoder of the recording apparatus.

The decoder 201 can then be configured to output the decoded audio signals to the directional processor 205.

The operation of decoding the audio signal is shown in FIG. 9 by step 803.

Furthermore the listening apparatus is configured to receive a recorder apparatus orientation input 700 on a separate input and pass the recorder orientation input 700 to the rotator 707.

The operation of receiving the recorder orientation input is shown in FIG. 9 by step 810.

The listening apparatus 20 can further be configured to receive the listener orientation input 200.

The operation receiving or determining the listener orientation input is shown in FIG. 9 by step 811.

The rotator 707 can be configured to receive both the recorder orientation input and listener orientation input and be configured to generate a rotation compensation value P(t) dependent on the listener and recorder orientation inputs. Thus in some embodiments the rotator 707 is configured to compensate not only motion of the recorder but also motion of the listener to stabilise the audio signal with respect to recorder orientation and to enable the listener to rotate or experience the audio scene in a three dimensional manner by rotating as the listener rotates.

This can mathematically be the combination of the recorder apparatus stabilization and listening apparatus rotation operations, $$P(t)=[\lambda(t_0)-\lambda(t)]-[\theta(t_0)-\theta(t)].$$

The rotator 707 can then be configured to output the rotator information in the form of a rotator angle value P(t) to the directional processor 205.

In some embodiments as described herein the rotator 707 can be configured to receive at least one user input.

The determination of the rotation dependent on the listener and recorder orientation input is shown in FIG. 9 by step 813.

The listening apparatus in some embodiments comprises the directional processor 205 configured to receive the decoder output and the rotator output. The directional processor 205 can then be configured to rotate the audio signal $\alpha_b(t)$ according to the value provided by the rotator 707 P(t). This can be mathematically summarised as $$\alpha'_b(t)=\alpha_b(t)+P(t),$$

The operation of directionally processing the audio signal dependent on the rotation angle is shown in FIG. 9 by step 815.

As described herein the directional processor 205 can be configured to selectively rotate sources (for example selective sub-bands) dependent on the selection criteria and the rotator output.

The directional processor 205, having rotated or directionally processed the audio signal, can then be configured to generate a playback output signal, in other words render the audio signals in a suitable manner to be displayed by the listening apparatus. The directional processor can output the audio signals on the playback output 210.

The operation of outputting the audio to the listener is shown in FIG. 9 by step 817.

In the example described herein the rotator and directional processor are configured to generate a single rotational value from the recorder and listener apparatus rotational inputs and apply the single value to the sub-band orientation information. However it would be understood that in some embodiments each rotation can be applied serially. In other words the rotator and directional processor can be configured to firstly modify the audio signal according to recorder apparatus orientation and secondly modify the recorder apparatus orientation modified audio signal according to listener orientation (or vice versa).

Figure 10:
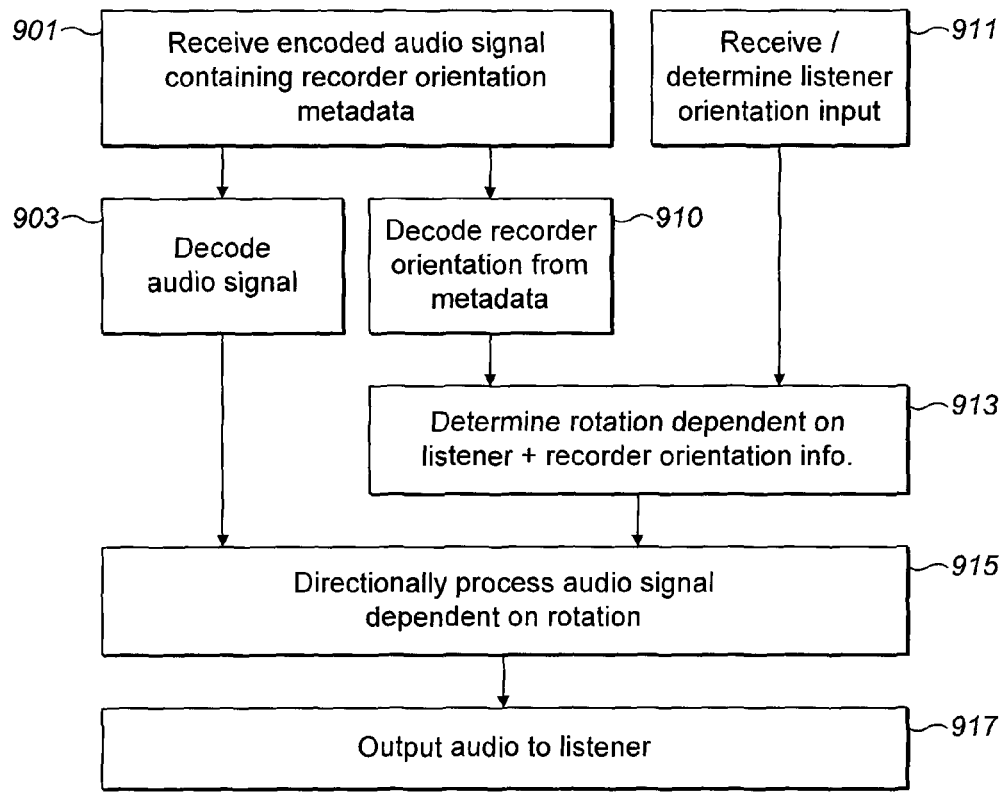
FIG. 10 shows a further flow diagram of the operation of the listening apparatus shown in FIG. 8 according to some embodiments.

With respect to the examples shown by FIGS. 8 and 10 the listening apparatus 20 is configured to receive the encoded audio input in the form of an audio signal with metadata containing the recorder orientation. In such embodiments the recorder apparatus orientation can be supplied in the form other than a separate recorder orientation input 700 as shown by the dashed line from the decoder.

Thus decoder 201 as shown in FIG. 8 can in some embodiments receive the encoded audio signal containing recorder apparatus orientation metadata.

The operation of receiving the encoded audio signal containing recorder orientation metadata is shown in FIG. 10 by step 901.

The decoder 201 can be configured in such embodiments to decode the audio signal into the suitable audio format as described herein.

The operation of decoding the audio signal is shown in FIG. 10 by step 903.

The decoded audio signal can then be passed to the directional processor 205.

Furthermore the decoder 201 can be configured to decode the recorder apparatus orientation information from the metadata and pass the recorder apparatus orientation information to the rotator 707.

The operation of decoding the recorder orientation from the metadata is shown in FIG. 10 by step 910.

The rotator 707 can be configured to furthermore receive or determine the listener orientation input.

The operation of receiving or determining the listener orientation input is shown in FIG. 10 by step 911.

The rotator 707 having received the decoded recorder apparatus orientation information from the decoder 201 and the listener orientation input providing the listener orientation can be configured to determine the rotation dependent on the listener and recorder orientation information. The rotator 707 can thus perform the same operations as described herein.

The operation of determining the rotation dependent on the listener and recorder orientation information is shown in FIG. 10 by step 913.

The rotator 707 output the rotator angle (P(t)) to the directional processor 205 which as described herein is configured to directional process the audio signal received from the decoder 201 according to or dependent on the rotation angle provided by the rotator 707.

The directionally processing of the audio signal dependent on the rotation is shown in FIG. 10 by step 915.

Furthermore as described herein the directional processor 205 can be configured to render or process the directionally processed audio signal to generate a form suitable to be output on the playback output 210. For example the playback output can be configured to be headphones, stereo loudspeakers or various real or virtual multiple loudspeaker setups.

The outputting of the audio to the listener is shown in FIG. 10 by step 917.

Figure 11:
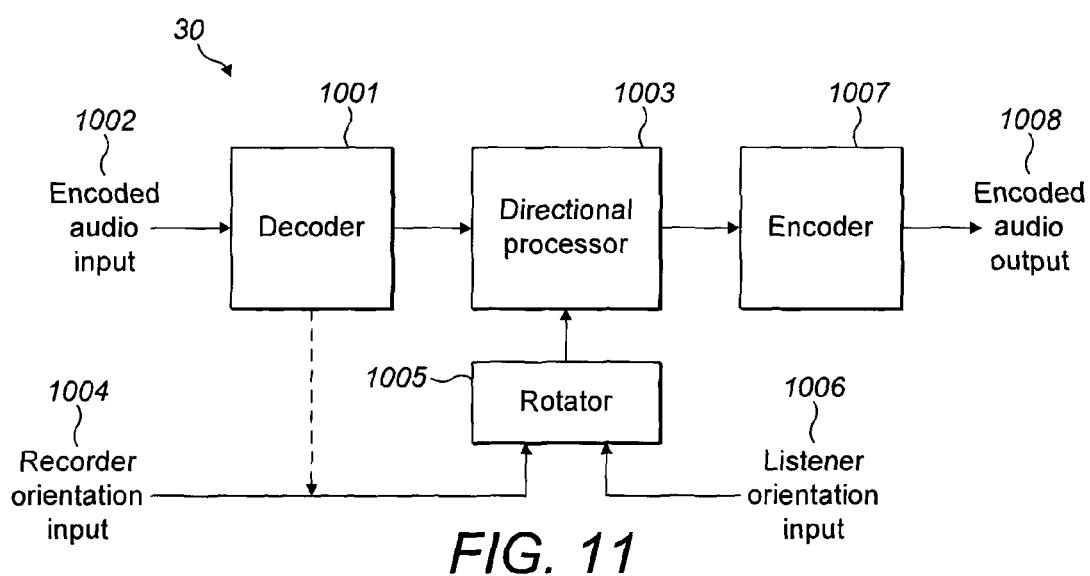
FIG. 11 shows schematically an example audio server according to some embodiments.
Figure 12:
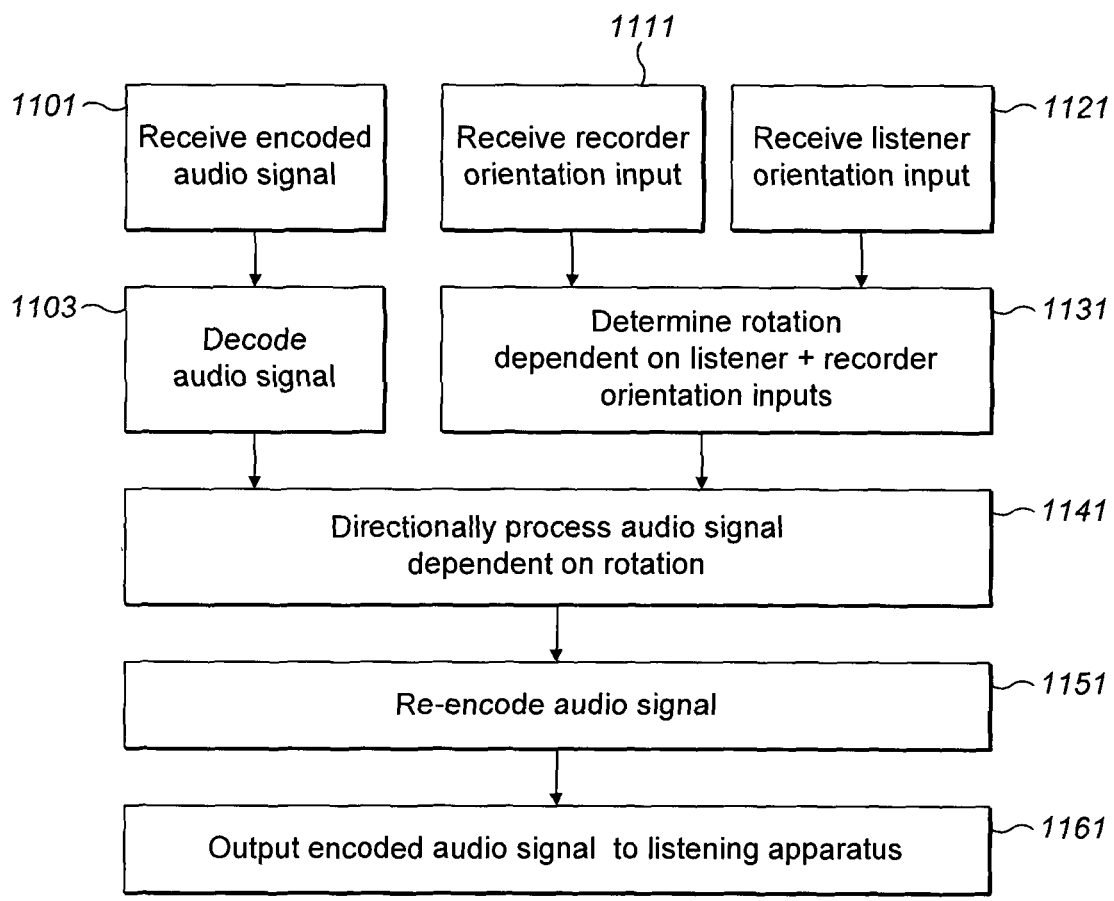
FIG. 12 shows a flow diagram of the operation of the audio server according to some embodiments.
Figure 13:
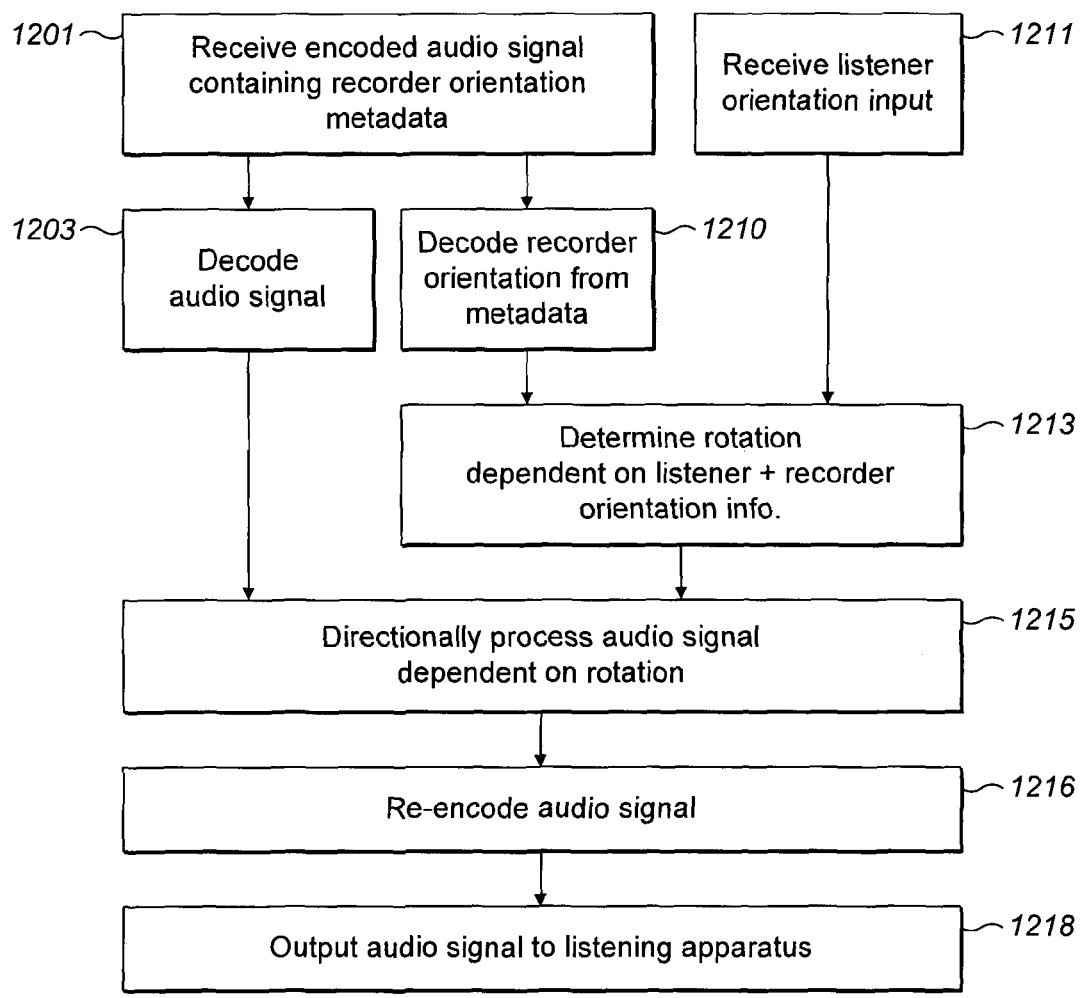
FIG. 13 shows a further flow diagram of the operation of the audio server according to some embodiments.

With respect to FIG. 11 and FIGS. 12 and 13 the operation of the audio server 30 according to some embodiments is described.

With respect to FIG. 11 and FIG. 12 the operation of the audio server 30 is described wherein the audio server receives a separate encoded audio input 1002 and separate recorder orientation input 1004.

Furthermore in some embodiments the encoded audio input 1002 comprises the recorder orientation information in terms of metadata and thus does not require a separate recorder orientation input shown in FIG. 11 as 1004.

In some embodiments the audio server comprises a decoder 1001. The decoder 1001 is configured to receive the encoded audio input 1002.

The operation of receiving the encoded audio signal is shown in FIG. 12 by step 1101.

The decoder 1001 can in some embodiments be configured to decode the audio signal in an inverse process to the encoder shown in FIG. 3. Thus in some embodiments the decoder 1003 can be configured to output the dominant angles, mid signals and side signals for the sub-bands to a directional processor 1003.

The operation of decoding the audio signal is shown in FIG. 12 by step 1003.

In some embodiments the audio server comprises a rotator 1005. The rotator 1005 is configured to receive the recorder apparatus orientation information from the recorder orientation input 1004.

The operation of receiving the recorder orientation information is shown in FIG. 12 by step 1111.

Furthermore the rotator 1005 can be configured to receive the listener apparatus orientation information from the listening apparatus via the listener orientation input 1006.

The operation of receiving the listener orientation information is shown in FIG. 12 by step 1121.

The rotator 1005 can be configured to having received the recorder orientation and listener orientation to determine a suitable correction angle. The rotator 1005 can the pass this correction angle value to the directional processor 1003. The rotator can for example generate a correction angle value in a manner similar to the rotator shown in the listening apparatus as shown in FIG. 8 and as described herein.

The operation of determining the rotation dependent on the listener and recorder orientation values is shown in FIG. 12 by step 1131.

The audio server 30 in some embodiments comprises a directional processor 1003. The directional processor 1003 can be configured to, in some embodiments, receive the decoded audio signals from the decoder 1001 and the rotator value from the rotator 1005 and directionally process the audio signal dependent on the rotation angle. Thus the directional processor 1003 can perform a similar action to that provided by the directional processor 205 in the listening apparatus as shown in FIG. 8 compensating for both listener and recorder orientation changes.

The directional processor 1003 can then be configured to output the directionally processed audio signal to an encoder 1007.

The operation of directionally processing the audio signal dependent on the rotation is shown in FIG. 12 by step 1141.

In some embodiments the audio server 30 comprises an encoder 1007 configured to receive the directionally processed audio signal. The directionally processed audio signal is then encoded in the encoder 1007 in any suitable format. In some embodiments the encoder 1007 can perform the same encoding operation as performed in the recording apparatus, in other words to provide a transparent service with regards to the listening apparatus. However in some embodiments the encoder 1007 can be a separate (form or mode) of encoding more suitable for the listening apparatus. In other words the audio server 30 can in some embodiments be configured to perform transcoding where input and output audio signals have different formats. Furthermore in some embodiments where the audio signal is received in a parametric form then the audio server can receive the audio signal directly (in other words without a need to decode it or have a decoder).

The recoding of the audio signal is shown in FIG. 12 by step 1151.

The encoder 1007 can then output the encoded audio signal on an encoded audio output 1008. In some embodiments the encoder 1007 can output the encoded audio signal via a transceiver to the listening apparatus. However in some embodiments the encoder can output the encoded audio signal to a memory or other storage device for later recall. Furthermore in some embodiments following the directional processing the processed audio signal can be configured to output the processed parametric audio signal to the listener apparatus (in other words make the encoder and encoding of the processed audio signal optional).

The output of the encoded audio signal, for example to the listening apparatus is shown in FIG. 12 by step 1161.

With respect to FIG. 13 the operation of the audio server 30 where the encoded audio input comprises both an audio signal and the metadata containing recorder orientation is shown in further detail.

In such embodiments the decoder is configured to receive the encoded audio signal containing recorder orientation metadata.

The operation of receiving encoded audio signal containing recorder orientation metadata is shown in FIG. 13 by step 1201.

The decoder 1001 can then be configured to decode the audio signal and pass the decoded audio signal to the directional processor 1003 as described herein.

The operation of decoding the audio signal is shown in FIG. 13 by step 1203.

Furthermore the decoder 1001 can be configured to decode the recorder orientation information from the metadata and pass the orientation information to the rotator 1005.

The operation of decoding the recorder orientation from the metadata is shown in FIG. 13 by step 1210.

The rotator 1005 can furthermore be configured to receive the listener orientation input from the listening apparatus.

The operation of receiving the listener orientation input is shown in FIG. 13 by step 1211.

The rotator 1005 can be configured to then determine a rotation or compensation angle dependent on the listener and recorder orientation information and pass this information to the directional processor 1003.

The operation of determining the rotation dependent on the listener and recorder orientation information is shown in FIG. 13 by step 1213.

The directional processor 1003 as described herein can then directionally process the audio signal dependent on the rotation angle provided.

The operation of directionally processing the audio signal depending on the rotation is shown in FIG. 13 by step 1215.

The directionally processed audio signal can then be passed to the encoder 1007 which now re-encodes the audio signal according to a suitable encoding which can in some embodiments be the same as the encoder in the recording apparatus or be different.

The operation of re-encoding the audio signal is shown in FIG. 13 by step 1216.

Furthermore the encoder 1007 can then output the encoded audio signal on the encoded audio output 1008. The encoded audio output can be passed to the listening apparatus or in some embodiments be stored on a memory or storage device as described herein.

The operation of outputting the audio signal to the listening apparatus is shown in FIG. 13 by step 1218.

Figure 14:
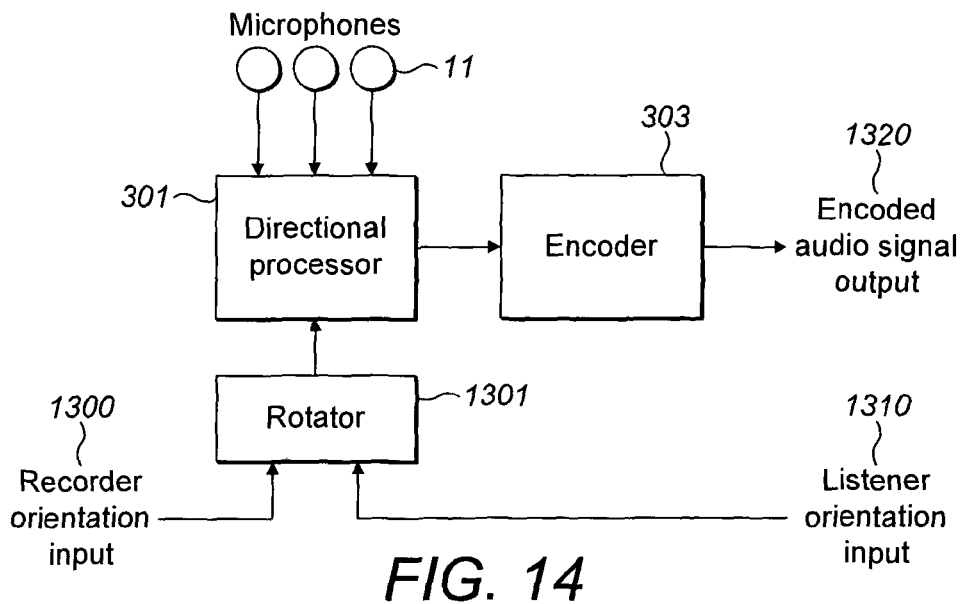
FIG. 14 shows schematically a further example of recording apparatus according to some embodiments.

With respect to FIG. 14 an example recording apparatus configured to compensate for both recorder and listener orientation is shown in further detail. Furthermore with respect to FIG. 15 the operation of the recorder apparatus shown in FIG. 14 is described in further detail.

As described herein the microphone array 11 is configured to generate audio signals which are passed to the directional processor 301.

Figure 15:
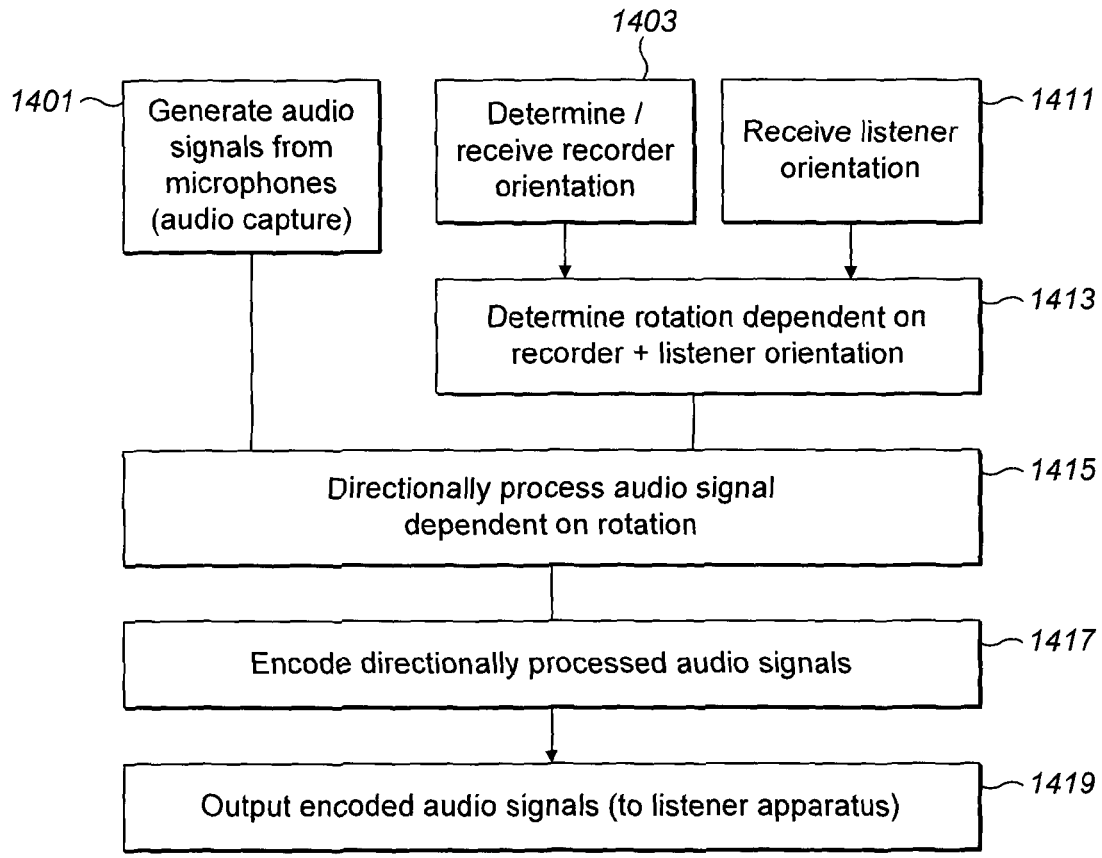
FIG. 15 shows a flow diagram of the operation of the recording apparatus shown in FIG. 14 according to some embodiments.

The generation of audio signals from the microphones is shown in FIG. 15 by step 1401.

Furthermore in some embodiments the recording apparatus comprises a rotator 1301. The rotator 1301 is configured to determine or receive the recorder apparatus orientation, for example from a recorder orientation input 1300.

The operation of determining or receiving the recorder orientation is shown in FIG. 15 by step 1403.

Furthermore the rotator 1301 is configured to receive via a listener orientation input 1310 a listener apparatus orientation.

The operation of receiving the listener apparatus orientation is shown in FIG. 15 by step 1411.

The rotator 1301 is then configured to determine a rotation or compensation angle dependent on the recorder and listener orientation. The rotator 1301 can thus be similar to the rotators described with respect to the listening apparatus and audio server where the rotator receives both recorder orientation and listener orientation inputs.

The determined rotation can then be passed to the directional processor 301.

The operation of determining the rotation dependent on the recorder and listener orientations is shown in FIG. 15 by step 1413.

The recording apparatus can in some embodiments comprise a directional processor 301 as described herein and described previously with respect to FIG. 3. The directional processor 301 is configured to receive the rotator angle 1301 and directionally process the audio signals dependent on the rotation angle. The directional processor 301 can thus output the directionally processed audio signals to the encoder 303.

The operation of directionally processing the audio signals dependent on the rotation or correction angle is shown in FIG. 15 by step 1415.

The recording apparatus can further comprise an encoder 303 configured to receive the directionally processed audio signals and output an encoded audio signal according to a suitable encoding.

The operation of encoding the directionally processed audio signals is shown in FIG. 15 by step 1417.

Furthermore the encoder can be configured to output the encoded audio signal to a memory or listening device or audio server via an encoded audio signal output 1320.

The operation of outputting the encoded audio signals to a listening apparatus is shown in FIG. 15 in step 1419.

It is possible therefore in example implementations to produce an enhanced "hear-what-I-hear" concept. In such applications a person A can use a headset equipped with binaural microphones are preferably multiple microphones for spatial capture. The sound scene is recorded, converted to an appropriate audio format and then transmitted to another person B for listening. When person A or both persons are using the embodiments of the application an improved recording experience can be produced. Thus at the recording side the embodiments of the application can compensate for head movements of person A and produce a stabilised sound scene by controlling the spatial audio capture according to the head orientation. These stabilised audio signals can then be passed to the person B and the head movements of person B compensated for by using the embodiments of the application during the rendering of the sound scene.

In some embodiments a real time system can provide orientation only in one particular processing unit instead of processing them both separately in both devices as shown herein with respect to the recording apparatus, listening apparatus and audio server which can be used to modify the recorded signals and producing an enhanced signal. In other words, in some embodiments the directional processing can be performed at one location. For example as described herein the listening apparatus can in some embodiments be configure to calculate the difference between orientations of the recorded signal and the listener. In some embodiments the processing can take place in an audio server to which both the recorder and listener send their orientation signals. Furthermore in some embodiments where the listener sends their orientation to the recording apparatus, the recording apparatus can perform this processing.

In some embodiments a selection of a reference direction or an implicit reference direction is defined. An example reference direction could be for example magnetic north or some other angle dependent on magnetic north, a mobile platform such as a vehicle or a person, a structure defined by a GPS coordinate, another mobile device and differential tracking between the two, a variable reference such as a filtered direction of movement or any object in the virtual environment.

Where differential head tracking is used for audio recording it is possible to separate the listener's head movements from the body orientation. Thus head movements relative to body of the motion of a person who is making the capturing or recording can be removed from the recording and the sound scene locked to the reference direction. In some embodiments the reference direction can be allowed to turn slowly to the current direction of the user. Where the embodiments of the application detect rapid changes of head movements the reference is not significantly changed but where a new orientation is kept for a length of time or for a defined period the reference is slowly turned to that direction. This can be beneficial for example where the user is in a vehicle of which the orientation changes cannot be segregated from the listeners head orientation changes.

In such embodiments 3D voice conferencing can be implemented where the mobile device can be used a recording apparatus capturing the spatial sound scene in the conference room. Where the orientation of the apparatus is changed during the conference session the embodiments of the application compensate for this such that the participants at the remote end do not 'hear' a rotation of the sound scene. For example recording apparatus can be rotated clockwise on a table and the sound scene is rotated automatically to the opposite direction according to the apparatus orientation signal to compensate for the apparatus orientation change.

In some embodiments the stabilisation of the recorded audio scene can be used even when the user is moving with the camera and turning in different directions. This can for example be beneficial when recording music performances etc. The video capture in some embodiments can have a user interface selection to use a "steady audio capture" mode which permits apparatus recording orientation and/or recording position compensation processing where the sound scene is locked to a specific position/direction regardless of the apparatus motion/rotation. The user can in some embodiments enable/disable stabilisation e.g. by clicking a virtual button on device touch screen (or some other user interface input). When the virtual button is clicked the current orientation of the device is selected as a reference orientation/position. Thus, regardless of user turning the device to different directions, the audio scene is kept locked to reference direction. In the examples discussed herein the orientation reference and apparatus orientation is discussed however it would be understood that position stabilisation can be employed in a similar manner.

Alternatively, stabilization can used to compensate only quick or small direction changes (this stabilization can be compared to an optical stabilization of a camera to remove hand-shaking effect but implemented in the audio signal domain). In the first case the moving average of device orientation can be used as the reference direction (and thus the reference is updated actively).

In some embodiments where the audio is captured or recorded and stored to an audio file with the apparatus orientation signal and selected reference as metadata the audio signal may processed offline and an audio editor may provide automatic stabilisation options to compensate for apparatus orientation changes that happen during recording. In some embodiments where stabilisation processing has been performed in the recording device, the apparatus orientation signal can be used to undo the stabilisation operation and return the audio signal to an unaltered form. For example the user or operator of the recording apparatus can apply stabilization which can then be removed by the user or operator of the listening apparatus.

In some embodiments as the recording apparatus makes an orientation compensation of the recording apparatus orientation changes it can forward to the encoder a modified orientation signal including the effect of compensation processing in addition to or instead of the original orientation signal. In such a way in some embodiments the listening apparatus can undo the effect of compensation processing according to the modified orientation signal and retrieve the original captured signal without compensation processing. In some embodiments additional parameters can be provided to describe where the audio is an original or processed one.

In some embodiments the use of GPS position and apparatus orientation signals it can be possible to map and store captured audio and clips to a virtual map. In such an embodiment when the user is using a map service and selects (or clicks) a stored clip on a map the audio can be played to the user from the view point the user has selected. In such embodiments the audio stabilisation can be pre-processed so only the listeners 'viewpoint' orientation processing is required. In some embodiments the compensation processing can occur during the listening phase.

In some embodiments the microphone configuration can be omnidirectional to achieve high quality result in some other embodiments the microphones can be placed for example in front, back and side of the listeners head. Spatial audio capture (SPAC) format created by Nokia or directional audio coding (DirAC) are suitable methods for audio capture, directional analysis and processing and both enable orientation processing for the signals. SPAC requires that at least three microphones are available in the recording device to enable orientation processing.

In some embodiments the audio format is required to support the sound scene rotation.

In some examples of binaural signal the estimate of sound source locations can be provided in order to remove intra-aural time differences.

In the embodiments described herein only orientation compensation are mentioned. However this can be extended to a full three dimensional compensation where pitch, roll, and yaw can be applied with specific microphone configurations or arrangements. In such embodiments selection of the reference direction can be agreed between the recording apparatus and listening apparatus (at least implicitly). In some embodiments the selected reference can be stored or transmitted as metadata with the audio signal.

In some embodiments the orientation processing can occur within the coding domain. However in some embodiments the audio signal can be processed within the non-coded domain.

It shall be appreciated that the term user equipment is intended to cover any suitable type of wireless user equipment, such as mobile telephones, portable data processing devices or portable web browsers, as well as wearable devices.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. Apparatus comprising at least one processor and at least one memory including computer code for one or more programs, the at least one memory and the computer code configured to with the at least one processor cause the apparatus to at least:
   analyse at least one audio signal recorded by the apparatus to determine at least one audio component with an associated orientation parameter;
   define at least one of a reference orientation for the apparatus and a reference position for the apparatus;
   determine a direction value based on the defined at least one of the reference orientation and position and at least one of an orientation of the apparatus, a position of the apparatus, an orientation of a further apparatus co-operating with the apparatus, and a position of the further apparatus;
   process at least one associated directional parameter for the at least one audio component dependent on the determined direction value to compensate for orientation changes in the apparatus during the recording of the at least one audio signal; and
   generating at least one audio signal depending on the processed at least one associated directional parameter.

2. The apparatus as claimed in claim 1, further caused to generate the at least one audio signal based on the processed at least one associated directional parameter.

3. The apparatus as claimed in claim 2, wherein the generated at least one audio signal causes the apparatus to generate the audio signal from a microphone array.

4. The apparatus as claimed in claim 3, wherein the determined direction value is further provided based on at least one of an orientation of the microphone array and a position of the microphone array.

5. The apparatus as claimed in claim 1, wherein the determined direction value causes the apparatus to determine the direction value based on at least one of:
    an orientation change of the apparatus with respect to at least one of the reference orientation and position; and
    an orientation change of the further apparatus with respect to at least one of the reference orientation and position.

6. The apparatus as claimed in claim 1, wherein the defined at least one of the reference orientation and position causes the apparatus to:
    receive a user interface input to define the at least one of the reference orientation and position;
    determine at least one of the apparatus orientation and position; and
    define at least one of the reference orientation and position as the at least one of the apparatus orientation and position.

7. The apparatus as claimed in claim 1, further caused to receive at least one of:
    the orientation of the further apparatus co-operating with the apparatus; and
    the position of the further apparatus co-operating with the apparatus.

8. The apparatus as claimed in claim 1, wherein the apparatus analyses the at least one audio signal from a recording apparatus to determine the at least one audio component with the associated orientation parameter;
    receive at least one of a reference orientation for the recording apparatus and a reference position for the recording apparatus;
    receive at least one of an orientation of the recording apparatus, a position of the recording apparatus;
    determine the direction value dependent on at least one of the recording apparatus reference orientation and position and at least one of the orientation of the recording apparatus; the position of the recording apparatus; and
    Process the at least one associated directional parameter for the at least one audio component dependent on the determine direction value.

9. The apparatus as claimed in claim 8, wherein the determined direction value causes the apparatus to at least one of:
    an orientation change of the recording apparatus with respect to the at least one of the reference orientation and position; and
    an orientation change of the apparatus with respect to the at least one of the reference orientation and position.

10. The apparatus as claimed in claim 1, wherein the apparatus further analyses the at least one audio signal from a recording apparatus to determine the at least one audio component;
    receive at least one of a reference orientation for the recording apparatus and a reference position for the recording apparatus;
    receive at least one of an orientation of the recording apparatus, a position of the recording apparatus, an orientation of a listening apparatus and a position of the listening apparatus;
    determine the direction value, wherein the direction value is based on at least one of the reference orientation and position for the recording apparatus and at least one of the orientation of the recording apparatus, the position of the recording apparatus, the orientation of the listening apparatus and the position of the listening apparatus, and
    process at least one associated directional parameter for the at least one audio component dependent on the direction value.

11. The apparatus as claimed in claim 10, wherein the determined direction value causes the apparatus to determine the direction value based on at least one of:
    an orientation change of the recording apparatus with respect to at least one of the reference orientation and position for the recording apparatus; and
    an orientation change of the listening apparatus with respect to at least one of the reference orientation and position for the recording apparatus.

12. The apparatus as claimed in claim 10, further caused to output the processed audio signal to the listening apparatus when the direction value is determined based on at least one of the orientation and position of the listening apparatus.

13. The apparatus as claimed in claim 1, wherein the analysed at least one audio signal to determine the at least one audio component with the associated orientation parameter causes the apparatus to:
    identify at least two separate audio channels;
    generate at least one audio signal frame comprising a selection of audio signal samples from the at least two separate audio channels;
    convert the at least one audio signal frame by a time-to-frequency domain conversion to generate a frequency domain representation of the at least one audio signal frame for the at least two separate audio channels;
    filter the frequency domain representation into at least two sub-band frequency domain representations for the at least two separate audio channels;
    compare at least two sub-band frequency domain representation for the at least two separate audio channels to determine an audio component in common; and
    determine an orientation parameter for the audio component relative to the apparatus.

14. The apparatus as claimed in claim 1, wherein the processed at least one associated directional parameter for the at least one audio component causes the apparatus to change at least one associated directional parameter for the at least one audio component such that the audio signal is stabilized with respect to motion of the apparatus and at least one of the reference orientation and position.

15. The apparatus as claimed in claim 1, wherein the directional value is determined from the at least one audio signal to compensate for a recorder orientation by modifying direction of sound sources.

16. The apparatus as claimed in claim 1, wherein the apparatus further comprises at least one sensor to determine the at least one of the orientation and position of the apparatus.

17. The apparatus as claimed in claim 1, wherein the apparatus is configured to process the at least one audio signal from at least one microphone to determine spatial information.

18. A method comprising:
analysing at least one audio signal recorded by an apparatus to determine at least one audio component with an associated orientation parameter;
defining at least one of a reference orientation for an apparatus and a reference position for the apparatus;
determining a direction value based on at least one of the reference orientation and position for the apparatus and at least one of the an orientation of the apparatus, a position of the apparatus, an orientation of a further apparatus co-operating with the apparatus, and a position of the further apparatus;
processing at least one associated directional parameter for the at least one audio component dependent on the direction value to compensate for orientation changes in the apparatus during the recording of the at least one audio signal; and
generating at least one audio signal is generated depending on the processed at least one associated directional parameter.

19. The method as claimed in claim 18, wherein the method is analyzing at least one audio signal from a recording apparatus to determine at least one audio component with an associated orientation parameter;
receiving at least one of a reference orientation for the recording apparatus and a reference position for the recording apparatus;
receiving at least one of an orientation of the recording apparatus and a position of the recording apparatus;
determining the direction value based on at least one of the recording apparatus reference orientation and position and at least one of the orientation of the recording apparatus and the position of the recording apparatus; and
processing at least one associated directional parameter for the at least one audio component dependent on the direction value.

20. The method as claimed in claim 18, wherein the method is further receiving at least one of an orientation of a listening apparatus and a position of the listening apparatus;
determining the direction value based on at least one of the orientation of the listening apparatus and position of the listening apparatus; and
processing the at least one associated directional parameter for the at least one audio component dependent on the determining the direction value.

* * * * *